(12) United States Patent
Jenkins et al.

(10) Patent No.: US 7,868,753 B2
(45) Date of Patent: Jan. 11, 2011

(54) PORTABLE DATA ACQUISITION AND MANAGEMENT SYSTEM AND ASSOCIATED DEVICE AND METHOD

(75) Inventors: Rhesa Jenkins, Atlanta, GA (US); Craig Graham, Hanover, PA (US); Pamela Klouda, Manchester, MD (US); Prabhakar Thyagarjan, Laurel, MD (US); Jonathan Hock, Glen Arm, MD (US); Mike Shamel, Owings Mills, MD (US); David Snader, New Freedom, PA (US); Mike Cutler, Hampstead, MD (US); John Olsen, Cumming, GA (US); Mark Horton, Suwanee, GA (US); Mike Kerr, Owings Mills, MD (US)

(73) Assignee: United Parcel Service of America, Inc., Atlanta, GA (US)

( * ) Notice: Subject to any disclaimer, the term of this patent is extended or adjusted under 35 U.S.C. 154(b) by 780 days.

(21) Appl. No.: 11/688,631

(22) Filed: Mar. 20, 2007

(65) Prior Publication Data

US 2007/0285227 A1     Dec. 13, 2007

Related U.S. Application Data

(62) Division of application No. 10/227,147, filed on Aug. 23, 2002, now abandoned.

(60) Provisional application No. 60/314,806, filed on Aug. 24, 2001, provisional application No. 60/347,086, filed on Jan. 4, 2002, provisional application No. 60/347,756, filed on Jan. 11, 2002, provisional application No. 60/349,319, filed on Jan. 15, 2002, provisional application No. 60/360,135, filed on Feb. 25, 2002.

(51) Int. Cl.
  *G08B 1/08* (2006.01)

(52) U.S. Cl. .............. 340/539.13; 340/505; 340/539.1; 340/539.11

(58) Field of Classification Search ............... 340/505, 340/539.1, 539.11, 539.13, 568.1, 572.1, 340/988, 989; 705/28, 22; 235/375
See application file for complete search history.

(56) References Cited

U.S. PATENT DOCUMENTS 3,956,740 A    5/1976   Jones et al.

(Continued)

FOREIGN PATENT DOCUMENTS

DE         44 12 097 C1    6/1995

(Continued)

OTHER PUBLICATIONS

International Search Report and Written Opinion for PCT/US2005/000729 dated Jan. 10, 2006.

(Continued)

*Primary Examiner*—Daryl Pope
(74) *Attorney, Agent, or Firm*—Alston & Bird LLP

(57) ABSTRACT

A system for manipulating data is provided. Such a system comprises a host system, a discrete portable data acquisition device for collecting the data, at least one of a wireless wide area network (WWAN) data radio, a wireless local area network (WLAN) data radio, and a wireless personal area network (WPAN) data radio operably engaged with the portable data acquisition device and configured to at least one of transmit the data to the host system, communicate with a peripheral device, and receive data, and a memory operably engaged with the portable data acquisition device for storing the data, the memory comprising a FLASH memory module, a DRAM memory module, and an NVDRAM memory module. Associated systems, devices, and methods are also provided.

24 Claims, 24 Drawing Sheets

U.S. PATENT DOCUMENTS

| | | | |
|---|---|---|---|
| 4,408,782 A | 10/1983 | Condon | |
| 4,832,204 A | 5/1989 | Handy et al. | |
| 4,850,009 A | 7/1989 | Zook et al. | |
| 5,014,206 A | 5/1991 | Scribner et al. | |
| 5,227,614 A | 7/1993 | Danielson et al. | |
| 5,292,004 A | 3/1994 | Cesarini | |
| 5,313,051 A | 5/1994 | Brigida et al. | |
| 5,325,303 A | 6/1994 | Walz et al. | |
| 5,347,274 A | 9/1994 | Hassett et al. | |
| 5,375,226 A | 12/1994 | Sano et al. | |
| 5,444,444 A | 8/1995 | Ross et al. | |
| 5,472,097 A | 12/1995 | Villachica | |
| 5,496,992 A | 3/1996 | Madan et al. | |
| 5,497,149 A | 3/1996 | Fast | |
| 5,500,516 A | 3/1996 | Durbin | |
| 5,506,580 A | 4/1996 | Whiting et al. | |
| 5,528,758 A | 6/1996 | Yeh | |
| 5,532,694 A | 7/1996 | Mayers et al. | |
| 5,534,684 A | 7/1996 | Danielson | |
| 5,593,267 A | 1/1997 | McDonald et al. | |
| 5,635,693 A | 6/1997 | Benson et al. | |
| 5,648,770 A | 7/1997 | Ross | |
| 5,650,967 A | 7/1997 | Seibert | |
| 5,682,379 A | 10/1997 | Mahany et al. | |
| 5,736,725 A | 4/1998 | Danielson | |
| 5,751,973 A | 5/1998 | Hassett et al. | |
| 5,764,774 A | 6/1998 | Liu | |
| 5,770,841 A | 6/1998 | Moed et al. | |
| 5,778,377 A | 7/1998 | Marlin et al. | |
| 5,780,778 A | 7/1998 | Schwartz et al. | |
| 5,790,429 A | 8/1998 | Baker et al. | |
| 5,797,134 A | 8/1998 | McMillan et al. | |
| 5,805,416 A | 9/1998 | Friend et al. | |
| 5,805,419 A | 9/1998 | Hundt et al. | |
| 5,808,564 A | 9/1998 | Simms et al. | |
| 5,821,523 A | 10/1998 | Bunte et al. | |
| 5,822,739 A | 10/1998 | Kara | |
| 5,834,749 A | 11/1998 | Durbin | |
| 5,835,377 A | 11/1998 | Bush | |
| 5,855,006 A | 12/1998 | Huemoeller et al. | |
| 5,862,500 A | 1/1999 | Goodwin | |
| 5,867,382 A | 2/1999 | McLaughlin | |
| 5,869,819 A | 2/1999 | Knowles et al. | |
| 5,884,238 A | 3/1999 | Noll et al. | |
| 5,905,232 A | 5/1999 | Schwartz et al. | |
| 5,919,239 A | 7/1999 | Fraker et al. | |
| 5,948,040 A | 9/1999 | DeLorme et al. | |
| 5,971,587 A | 10/1999 | Kato et al. | |
| 5,992,753 A | 11/1999 | Xu | |
| 5,993,098 A | 11/1999 | Osada | |
| 5,995,118 A | 11/1999 | Masuda | |
| 5,995,950 A | 11/1999 | Barns-Slavin et al. | |
| 6,003,773 A | 12/1999 | Durbin et al. | |
| 6,006,106 A | 12/1999 | Cook et al. | |
| 6,018,715 A | 1/2000 | Lynch et al. | |
| 6,034,379 A | 3/2000 | Bunte et al. | |
| 6,061,398 A | 5/2000 | Satoh et al. | |
| 6,064,970 A | 5/2000 | McMillan et al. | |
| 6,071,643 A | 6/2000 | Chino et al. | |
| 6,084,528 A | 7/2000 | Beach et al. | |
| 6,124,806 A | 9/2000 | Cunningham et al. | |
| 6,134,437 A | 10/2000 | Karabinis et al. | |
| 6,148,262 A | 11/2000 | Fry | |
| 6,173,209 B1 | 1/2001 | Laval et al. | |
| 6,175,826 B1 | 1/2001 | Malandra, Jr. et al. | |
| 6,182,053 B1 * | 1/2001 | Rauber et al. | 705/28 |
| 6,189,702 B1 | 2/2001 | Bonnet | |
| 6,208,980 B1 | 3/2001 | Kara | |
| 6,211,781 B1 | 4/2001 | McDonald | |
| 6,241,099 B1 | 6/2001 | Hendrickson et al. | |
| 6,243,581 B1 | 6/2001 | Jawanda | |
| 6,246,672 B1 | 6/2001 | Lumelsky | |
| 6,249,008 B1 | 6/2001 | Bunte et al. | |
| 6,285,916 B1 | 9/2001 | Kadaba et al. | |
| 6,329,919 B1 | 12/2001 | Boies et al. | |
| 6,332,098 B2 | 12/2001 | Ross et al. | |
| 6,408,233 B1 | 6/2002 | Solomon et al. | |
| 6,433,732 B1 | 8/2002 | Dutta et al. | |
| 6,459,969 B1 | 10/2002 | Bates et al. | |
| 6,493,550 B1 | 12/2002 | Raith | |
| 6,496,775 B2 | 12/2002 | McDonald, Jr. et al. | |
| 6,529,786 B1 | 3/2003 | Sim | |
| 6,532,152 B1 * | 3/2003 | White et al. | 361/692 |
| 6,571,197 B1 | 5/2003 | Frank et al. | |
| 6,648,770 B1 | 11/2003 | Snyder | |
| 6,731,940 B1 | 5/2004 | Nagendran | |
| 6,745,027 B2 * | 6/2004 | Twitchell, Jr. | 455/422.1 |
| 6,749,122 B1 | 6/2004 | Koenck et al. | |
| 6,756,918 B2 | 6/2004 | Fomukong | |
| 6,801,850 B1 | 10/2004 | Wolfson | |
| 6,816,784 B1 | 11/2004 | Khan et al. | |
| 6,819,267 B1 | 11/2004 | Edmark et al. | |
| 6,868,386 B1 | 3/2005 | Henderson et al. | |
| 6,885,991 B2 | 4/2005 | Skonberg et al. | |
| 6,889,194 B1 | 5/2005 | Kadaba | |
| 6,895,329 B1 | 5/2005 | Wolfson | |
| 6,990,409 B2 | 1/2006 | Khan et al. | |
| 7,034,683 B2 | 4/2006 | Ghazarian | |
| 7,039,496 B2 | 5/2006 | Perez et al. | |
| 7,118,034 B2 | 10/2006 | Baldassari et al. | |
| 7,421,311 B2 | 9/2008 | Perez et al. | |
| 2001/0005171 A1 | 6/2001 | Farringdon et al. | |
| 2002/0006806 A1 | 1/2002 | Kinnunen et al. | |
| 2002/0010604 A1 | 1/2002 | Block | |
| 2002/0024448 A1 | 2/2002 | Olesen | |
| 2002/0044084 A1 | 4/2002 | Itoh et al. | |
| 2002/0065065 A1 | 5/2002 | Lunsford et al. | |
| 2002/0077060 A1 | 6/2002 | Lehikoinen et al. | |
| 2002/0082931 A1 | 6/2002 | Siegel et al. | |
| 2002/0085515 A1 | 7/2002 | Jaynes et al. | |
| 2002/0132632 A1 | 9/2002 | Brassil et al. | |
| 2002/0133437 A1 | 9/2002 | Ansley | |
| 2002/0137472 A1 | 9/2002 | Quinn et al. | |
| 2002/0156661 A1 | 10/2002 | Jones et al. | |
| 2003/0010822 A1 | 1/2003 | Davies et al. | |
| 2003/0040946 A1 | 2/2003 | Sprenger et al. | |
| 2003/0055689 A1 | 3/2003 | Block et al. | |
| 2003/0055690 A1 | 3/2003 | Garback | |
| 2003/0083060 A1 | 5/2003 | Menendez | |
| 2003/0109266 A1 | 6/2003 | Rafiah et al. | |
| 2003/0114206 A1 | 6/2003 | Timothy et al. | |
| 2003/0120526 A1 | 6/2003 | Altman et al. | |
| 2003/0144985 A1 | 7/2003 | Ebert | |
| 2003/0163287 A1 | 8/2003 | Vock et al. | |
| 2003/0224818 A1 | 12/2003 | Nagasaka et al. | |
| 2004/0249557 A1 | 12/2004 | Harrington et al. | |
| 2006/0164232 A1 | 7/2006 | Waterhouse et al. | |

FOREIGN PATENT DOCUMENTS

| | | |
|---|---|---|
| DE | 196 18 535 A1 | 7/1997 |
| EP | 0 635 800 A1 | 1/1995 |
| EP | 0 945 818 A2 | 9/1999 |
| EP | 1 050 793 A2 | 11/2000 |
| EP | 1 216 901 A1 | 6/2002 |
| GB | 2 225 459 A | 5/1990 |
| GB | 2 358 427 A | 7/2001 |
| GB | 2 363 884 A | 1/2002 |
| JP | 03-143824 | 6/1991 |
| JP | 04068942 | 3/1992 |
| JP | H6-333117 | 12/1994 |
| JP | 7-068222 | 3/1995 |
| JP | 07-199861 | 8/1995 |
| JP | 9-147032 | 11/1995 |

| | | |
|---|---|---|
| JP | 9-305669 | 11/1997 |
| JP | 10-255166 | 9/1998 |
| JP | 11-120493 | 4/1999 |
| JP | 11-347892 | 12/1999 |
| JP | 2001-209468 | 8/2001 |
| JP | 2001-278414 | 10/2001 |
| WO | WO 96/31846 | 10/1996 |
| WO | WO 01/91438 A1 | 11/2001 |
| WO | WO 03/014752 A1 | 2/2003 |
| WO | WO 03/081560 A1 | 10/2003 |

OTHER PUBLICATIONS

International Search Report for PCT/US2005/000729 dated Oct. 26, 2005.

International Search Report for PCT/US2005/000789 dated Jan. 10, 2006.

International Search Report for PCT/US2005/000789 dated Oct. 26, 2005.

Murphy, Jean V., "Yard Management Systems Extend Automation Beyond the Dock Door", *SupplyChainBrain.com*, Mar. 2005, Global Logistic & Supply Chain Strategies.

International Search Report for PCT/US05/42711 dated Jan. 16, 2008.

Chinese Office Action for Chinese Application No. 200710154280.1 dated Apr. 10, 2009.

European Office Action for European Application No. 02 796 435.2 dated Feb. 25, 2010.

Second Canadian Office Action for Canadian Application No. 2,443,132 dated Apr. 15, 2010.

* cited by examiner

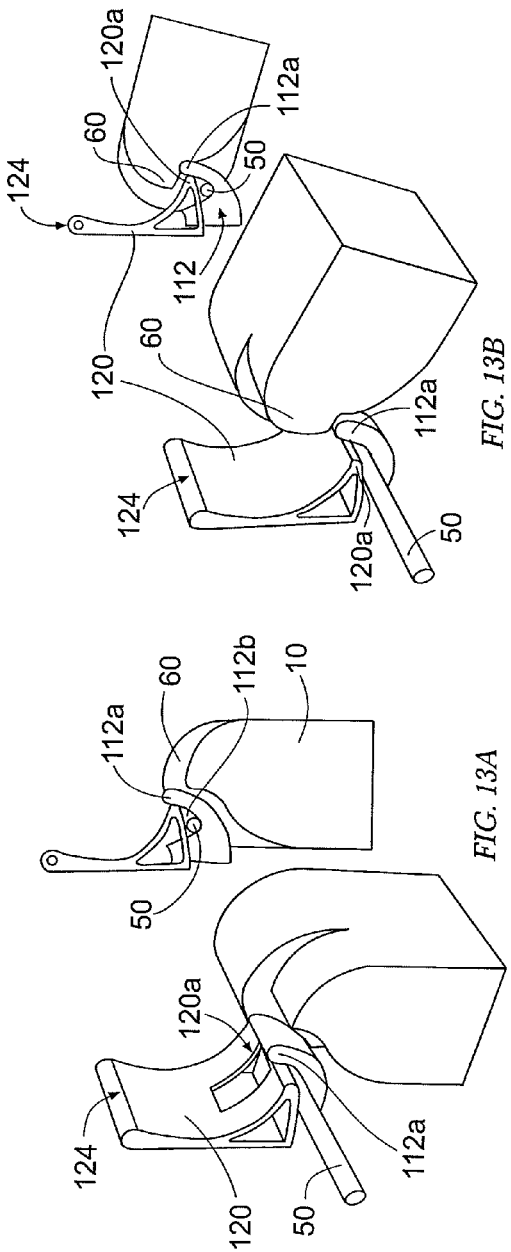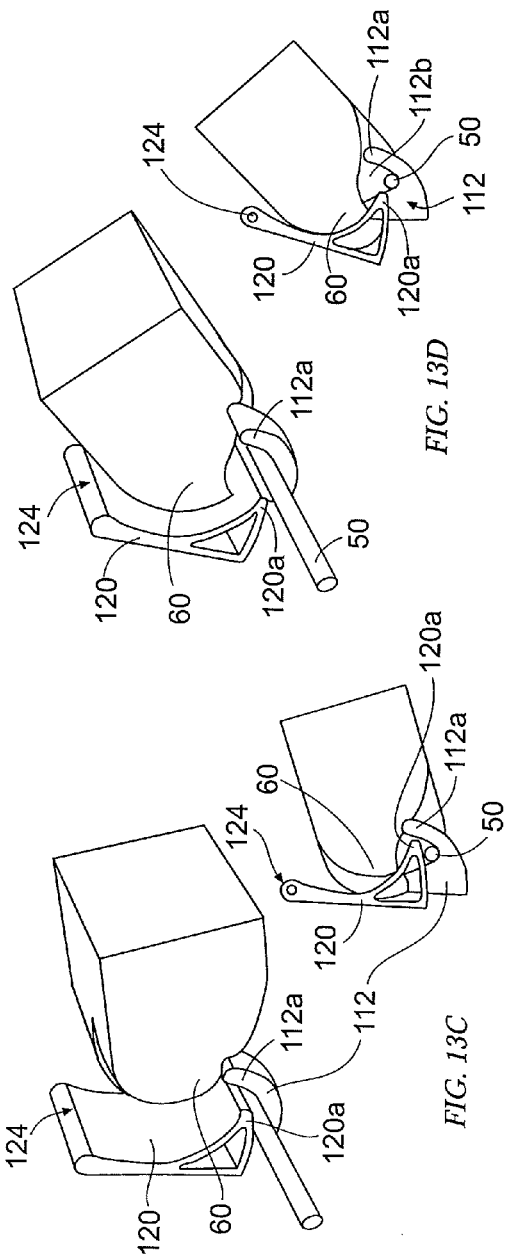

PORTABLE DATA ACQUISITION AND MANAGEMENT SYSTEM AND ASSOCIATED DEVICE AND METHOD

CROSS-REFERENCE TO RELATED APPLICATIONS

This application is a divisional application of U.S. patent application Ser. No. 10/227,147 entitled "Portable Data Acquisition and Management System and Associated Device and Method," filed Aug. 23, 2002, now abandoned, which claims the benefit of U.S. Provisional Patent Application Ser. Nos. 60/314,806, entitled "A System, Method and Apparatus for Collecting and Transmitting Package Data", filed Aug. 24, 2001; 60/347,086, entitled "Handheld Device for Data Collection and Transmission", filed Jan. 4, 2002; 60/347,756, entitled "Protected Memory, Ergonomic Design, And Secure Latching System For A Portable Electronic Data Management Device", filed Jan. 11, 2002; 60/349,319, entitled "Electronic Data Management Device and Methods of Use", filed Jan. 15, 2002; and 60/360,135, entitled "Portable Data Collection and Management System and Methods of Use, filed Feb. 25, 2002, each of which are incorporated herein by reference in their entirety.

BACKGROUND OF THE INVENTION

1. Field of the Invention

This invention relates to real-time package tracking systems, devices, and methods and, more particularly, to portable handheld devices configured to acquire information through multiple input interfaces and to provide acquired information to a central computer from remote locations. The device and its method of use are particularly useful in the field of parcel delivery and tracking. In one embodiment, the device of the present invention incorporates improvements in the Delivery Information Acquisition Device (DIAD) presently utilized by United Parcel Service (UPS).

2. Description of Related Art

In routine package delivery services, UPS delivery drivers obtain data using a Delivery Information Acquisition Device (DIAD). The DIAD is an electronic clipboard that replaces the driver's written documents and transmits shipment information directly into the UPS tracking system. Because the DIAD electronically records delivery information, it eliminates millions of sheets of paper per year and allows UPS to capture data and electronic signatures at a major point of contact, namely upon delivery to the recipient. Currently, more than sixty thousand delivery personnel utilize such DIADs.

To capture digital recipient signatures, the DIAD contains an LCD display having an integral (or separate) signature capture window that accepts input from a stylus. When the customer signs in the capture window using the stylus, the signature also appears on the LCD display. The DIAD's capture of digitized signatures enables these signatures to be available electronically for delivery verification. Signatures are uploaded onto a mainframe computer that is accessible by customer service representatives and by customers. Therefore, business customers who are connected electronically to UPS through secure connections (e.g., via the Internet) have access to the digitized signatures so they can pass them on to customers in response to customer inquiries. Similarly, when a customer asserts that a package was not delivered, the customer (or a customer service representative) can determine its exact status; specifically, whether the package was delivered and, if so, who signed for it.

For a typical delivery, the driver identifies a package to be delivered using a laser-scanner, built into or attached to the DIAD, to scan a bar code on the package. Additional data collected by the DIAD upon delivery is also captured using key entry, bar code scanning, electronic signature capture, and electronic data transfer. When a driver collects a package from a customer, shipping information may be captured using the DIAD by scanning a bar code on the package shipping label or by keypad entry. As with deliveries, electronic signature capture and data transfers to the DIAD can occur during a package pickup.

Although DIAD systems known in the art are effective, they have certain characteristics that limit their effectiveness in tracking package information in real time. For example, many portable electronic devices include two kinds of memory, namely a Random Access Memory (RAM) and programmable permanent memory. Generally, software applications are loaded, executed, and run in RAM. RAM is also used to receive data input by the user, as well as to display the application output or results to the user. The tasks of receiving data and displaying results are generally performed quickly in the RAM, allowing the user to input data freely, without the delay of storing the data in a more permanent memory. The amount of RAM available generally contributes to the perceived speed of the device. The speed of most RAM configurations, however, must be balanced with the risk of losing data or results. That is, RAM is sometimes called volatile memory because it requires a constant supply of electrical energy to maintain its data. As such, if the supply of electrical power is lost, the data in the RAM will also be lost.

Most types of permanent memory are non-volatile; that is, the permanent memory retains the data even if electrical power is lost. Most permanent memory is programmable, and thus suitable for storing software applications, and erasable, so that the memory can be re-programmed. Generally, selected data can be purposely stored in the permanent memory for later use. For example, the user might make ten quick data entries into the RAM, and then later store the data entries in the permanent memory.

In use, many portable electronic devices are subject to environmental forces, electronic failure, loss of power, and/or other catastrophic events that can automatically and abruptly erase the contents of the RAM. Once the input data stored in the RAM is lost, it cannot be recovered for storage in the permanent memory. Thus, there exists a need in the field of portable electronic devices for a non-volatile memory to quickly receive and store data, even in the event of a total failure of the device from a catastrophic event, and to provide long-term storage of the data. It would also be desirable to have an application program interface (API) for controlling and monitoring the status of data with respect to the non-volatile memory using the software application within the device.

Most portable electronic devices rely primarily or, in some cases, solely on a single operating system to store and access data. An operating system such as Windows™ CE is sometimes used in portable electronic devices. Because catastrophic failures and loss of power often interfere with the functioning of the operating system used in the device, there exists a need for a method of accessing stored data independently of the operating system. This task is further complicated by the variety of types of memory contained within certain portable electronic devices. The operating system is typically used to address or assign a specific location for storing a particular type of data. For example, the data for a particular package delivery might be found at a particular location or electronic address within the permanent memory of the device. Gaining access to the data without using the operating system that assigned the electronic address is very difficult and represents a current technical challenge in the field.

Customers with large numbers of packages to be delivered on a regular basis typically develop a shipping database that contains information about each package. Older portable electronic devices sometimes used a cable attachment to obtain data from the customer's database. This kind of direct link, however, sometimes interferes with and/or unduly invades a customer's private database. Also, many such customers are configuring their existing databases to be accessible over wireless networks.

Thus, there is a need for a portable electronic device that is capable of interacting with a customer's databases, with the customer's permission and while maintaining the security of the databases, without using a cable. There is also a need for an application that can obtain data from the customer's network without excessive interference or invasion into a customer's private databases or local networks. There is a further related need to provide an application program interface (API) for this feature and to control and monitor the operation thereof using the software application within the device.

Rechargeable battery packs have evolved, and some now include internal devices for governing recharging and testing functions for the battery pack. For example, a rechargeable battery may have a specific recharging station, wherein the recharging station may include indicators for the charge status of the battery, devices for testing the current capacity of the battery, and other functions for indicating the operational status of the battery pack. The demands on portable electronic devices currently in use, however, require closer management and control of the battery recharging and monitoring functions. Thus, there is a need for a system having the capacity to control and direct the recharging and testing of the battery, while the device is in use, without relying on the charging and testing system specifically associated with the battery pack and independent of the device. In other words, the technical demands placed upon devices in use today require closer management of the recharging of the battery pack. There is a related need to provide an application program interface (API) for this feature, as well as to control and monitor the operation thereof using the software application within the device.

The size and weight of the battery is a continuing technical challenge for portable electronic devices. The advent of rechargeable batteries has increased the predictability of battery life under various power usage conditions, but size and weight continue to present a technical challenge for portable device designers. There is a need, therefore, for a battery that is sized to provide sufficient power to the device during a typical work session while the user is away from the recharging station, without over-sizing the battery and creating an unnecessary size and weight burden upon the user.

Further, with regard to portable electronic devices, the increasing volume of data that can be gathered and stored on a portable electronic device has created a need for more efficient ways of storing and displaying data. Whereas older devices may have been capable of storing, for example, only an item number and a date, modern devices are capable of storing a multitude of text and numerical data about a single item or a single delivery. Thus, there exists a need for the capability of entering and displaying a multitude of data in a user-friendly and easily accessible format.

The need to enter text data into portable electronic devices has also driven the development of keypads that include every letter of the alphabet. Some designs mimic the arrangement and shape of the typical QWERTY typewriter keyboard, while others place the letters in alphabetical or some other order. The arrangement, size, and shape of the letter buttons vary depending on the particular device. However, in the field of portable electronic devices operated with two hands, there exists a need for a keypad that will accommodate the natural range of motion of the human thumbs. Thumb typing, to be efficient, requires not only a convenient key location but also a design that will account for the natural movement of the device during thumb typing. Further, because of the natural conditions in the operating environment for portable electronic devices, there also exists a need for a keypad that will accommodate gloved hands. In cold climates especially, the user may be wearing gloves during operation of the device and, thus, require keys that will be usable with a gloved hand.

The increasing use of rotary switches and dials on handheld portable devices has further created a need to develop ways to prevent accidental activation of the roller or dial, while allowing the switches to be in locations that coincide with the natural position of the fingers or hand. In devices that use a combination of generally-flat buttons and rotary dials, such components should be positioned in the areas that match the natural location of the hand, such that the buttons and the dial scan be operated with minimal, if any, repositioning of the hand.

Many handheld devices in use today provide push buttons, flat screens, and toggle switches, all of which can be configured to substantially prevent moisture intrusion into the device. A device with rotary switches, however, presents a unique challenge when the device is exposed to high levels of humidity in the operating environment. A dial for volume control, for example, or a rotary switch for scrolling through a menu or through text on a display, must be designed to freely rotate while not creating a vulnerable point for intrusion of environmental humidity and fluids. Thus, there is a need to develop water-resistant rotary switches that substantially prevent the intrusion of water and water vapor while not interfering with operation of the switch.

A variety of belt clips and other attachment units are found in the field of portable electronic devices. Many clips require the user to positively activate a lever or spring to disengage the electronic device from its clip. Providing a positive lock prevents unintentional disengagement of the unit without input from the user. This type of extracting technique, however, requires the use of two hands or at least the use of multiple parts of the same hand. For larger electronic devices and for operating environments where user efficiency would be sacrificed if two hands were required, there is a need for a clip that is capable of allowing one-handed operation. There is also a need for a device holder that provides positive feedback to the user about the engagement status of the device to the holder. Such feedback is also needed to inform the user when the device is properly aligned for engagement, when the device has been fully engaged, and when the device has been fully disengaged. A further need exists for a device holder which allows the user to access and operate the device without disengaging the device from the holder.

Industry standards developed to test the durability of containers to shock and vibration typically provide for the container to be dropped from a measured height such that the container is free of any rotational or horizontal velocity. This kind of drop test is intended to subject the container to the downward force of gravity only. Portable devices, however, are often dropped when the user is in motion horizontally, such as when a user is walking and stumbles. Also, users sometimes exert a rotational force against a portable device while grasping it, especially just as the device is being dropped. Accordingly, there exists a need in the field of shock testing for developing a dynamic test method and an apparatus such that the falling motion of the device during the test will more closely resemble the dynamics observed in the actual operating environment.

An unsatisfied need therefore exists in the industry for a real-time package tracking system that overcomes deficiencies in the prior art, some of which are discussed herein.

BRIEF SUMMARY OF THE INVENTION

Though some embodiments of the present invention are described herein in terms of collecting and manipulating package tracking data, it will be clearly understood that such an example in no way limits the applicability of the present invention. More particularly, embodiments of the present invention may be applied to any situation where collection and manipulation of data at a remote location and transmission of this data between the remote location and a central host system would be convenient and advantageous. Moreover, in instances referring to package tracking data, such terminology will be understood to include not only data associated with the packages and the tracking thereof, but any other associated information, whether related to the packages or not, including, for example, payment information, delivery location information, customer preference information, and customer status information. Thus, the terminology presented herein, in terms of the applicability of the present invention, is for example only and the present invention will be understood to have many different applications as described herein and within the spirit and scope of the present invention.

Accordingly, the above and other needs are met by the present invention which, in one embodiment, provides a system for manipulating data. Such a system comprises a host system, a discrete portable data acquisition device for collecting the data, at least one of a wireless wide area network (WWAN) data radio, a wireless local area network (WLAN) data radio, and a wireless personal area network (WPAN) data radio operably engaged with the portable data acquisition device and configured to at least one of transmit the data to the host system, communicate with a peripheral device, and receive data, and a memory operably engaged with the portable data acquisition device for storing the data and comprising a FLASH memory module, a DRAM memory module, and an NVDRAM memory module.

Another advantageous aspect of the present invention comprises a portable data acquisition device for manipulating data. Such a device includes at least one data input device for receiving data, a WWAN data radio adapted to transmit the stored data to a discrete, remotely located mainframe data repository, and a memory for storing the data and comprising a FLASH memory module, a DRAM memory module, and an NVDRAM memory module.

A further advantageous aspect of the present invention comprises a portable data acquisition device for manipulating data, including at least one data input device for receiving data, a memory for storing the data, and a WWAN data radio and a WLAN data radio, wherein each data radio is adapted to at least one of transmit the stored data to a remotely located mainframe data repository and receive data.

Still another advantageous aspect of the present invention comprises portable data acquisition device for manipulating data, including at least one data input device for receiving data, a memory for storing the data, and a WWAN data radio and a WPAN data radio, wherein each data radio is adapted to at least one of transmit the stored data to a remotely located mainframe data repository and communicate with a peripheral device.

Yet another advantageous aspect of the present invention comprises a portable data acquisition device for manipulating data, including at least one data input device for receiving data, a memory for storing the data, and a WWAN data radio, a WLAN data radio, and a WPAN data radio, wherein each data radio is adapted to at least one of transmit the stored data directly to a remotely located mainframe data repository, communicate with a peripheral device, and receive data.

Another advantageous aspect of the present invention comprises a data collection and transmission method. First information is collected and stored on a portable data acquisition device including a WPAN data radio. The information is then transmitted from the portable data acquisition device to an intermediate transmission device via the WPAN data radio, wherein the intermediate transmission device is connected to a wide area network. Thereafter, the information is transmitted from the intermediate transmission device to a host system via the wide area network. The intermediate transmission device may comprise a cellular phone or a satellite transceiver.

A further advantageous aspect of the present invention comprises a data collection and transmission system, including a portable data acquisition device for collecting and storing data, and having at least one of a WWAN communication port, a WLAN communication port, and a WPAN communication port. At least one peripheral device includes a WLAN communication port for receiving at least one communication from the portable data acquisition device and for performing an operation in response thereto. A central storage system is capable of communicating with the portable data acquisition device via the at least one of the WWAN communication port, the WLAN communication port, and the WPAN communication port, wherein the central storage system is further configured to receive the collected and stored data from the portable data acquisition device and to form and maintain a database of the collected and stored data.

Still another advantageous aspect of the present invention comprises a data collection and transmission system, including a portable data acquisition device for collecting and storing data, and a transceiver device operably engaged with the portable data acquisition device and including at least one of a WWAN communication port, a WLAN communication port, and a WPAN communication port. The system further includes at least one peripheral device including a WLAN communication port for receiving at least one communication from the portable data acquisition device and for performing an operation in response thereto. A central storage system is capable of communicating with the portable data acquisition device via the transceiver device and the at least one of the WWAN communication port, the WLAN communication port, and the WPAN communication port, wherein the central storage system is further configured to receive the collected and stored data from the portable data acquisition device via the transceiver device and to form and maintain a database of the collected and stored data.

Another advantageous aspect of the present invention comprises a method of delivering an item from an original location to a desired location. At least one of a latitude, a longitude, and an altitude associated with the desired location is loaded into a data acquisition device having an immediate location and the item is then delivered when the immediate location corresponds to the desired location.

A further advantageous aspect of the present invention comprises a method of identifying an inaccuracy in a delivery of an item. First, a destination address of the item and a destination GPS position associated with the destination address are directed to a data acquisition device, wherein the data acquisition device includes a GPS sensor. The item is transported to a location according to the destination address and an actual GPS position of the location is determined. The actual GPS position of the location is compared to the destination GPS position associated with the destination address and an alert for the inaccuracy in the delivery is provided if the comparison exceeds a selected threshold.

Still another advantageous aspect of the present invention comprises a data acquisition device having a GPS sensor configured to determine a GPS position of a location, wherein the GPS position includes at least one of a latitude, a longitude, and an altitude of the location. A processor is configured to receive NEMA formatted data for a destination address, wherein the NEMA formatted data has at least one of a latitude, a longitude and an altitude associated with the destination address. The processor is further configured to compare the GPS position of the location to the NEMA formatted data associated with the destination address, and to provide an alert if the comparison exceeds a selected threshold.

Yet still another advantageous aspect of the present invention comprises a system for collecting delivery data associated with a driver of a delivery vehicle for a carrier, wherein the delivery data includes at least one of time study statistics and work measurement statistics. Such a system includes a data acquisition device having a GPS sensor configured to determine GPS data, at least one sensor operably engaged with the delivery vehicle and configured to determine particular data, and an application residing on the data acquisition device. The application is configured to selectively direct, in real time, reception and recordation of the GPS data from the GPS sensor and reception and recordation of the particular data from the at least one sensor.

Another advantageous aspect of the present invention comprises a method of delivering an item from an original address to a destination address. First, delivery information associated with the item is directed to a data acquisition device, wherein the data acquisition device includes a GPS sensor, while the delivery information includes the destination address of the item and a GPS position associated with the destination address and provided by the GPS sensor. The item is then transported to a location, where an identifier associated with the item is captured from the item. The delivery information associated with the item is determined from the identifier and an actual GPS position of the location is determined. The GPS position associated with the destination address is then compared to the actual GPS position of the location so as to determine a position differential and an alert is provided if the position differential exceeds a threshold.

Still another advantageous aspect of the present invention comprises a method of delivering an item sent by a sender from an original address to a receiver at a destination address. First, delivery information associated with the item is directed from a server to a portable data acquisition device, wherein the portable data acquisition device includes a GPS sensor and at least one of a WLAN data radio and a WWAN data radio configured to receive the delivery information, while the delivery information includes the destination address of the item and a GPS position associated with the destination address. The item is delivered to a location according to the delivery information and then actual GPS data associated with the location is determined with the GPS sensor, wherein the actual GPS data includes a time of delivery and a physical location of delivery. At least one of the time of delivery and the physical location of delivery is then directed to the carrier server via at least one of the WLAN data radio and the WWAN data radio.

Still another advantageous aspect of the present invention comprises a method of delivering an item from a sender to a consignee. First, delivery information associated with the item is directed from a carrier server to a portable data acquisition device, wherein the portable data acquisition device includes a WPAN data radio, an Infrared Data Association (IrDA) communication port, and at least one of a WLAN data radio and a WWAN data radio for receiving the delivery information. The item is then delivered to the consignee according to the delivery information. Data associated with the delivery of the item to the consignee is then collected and directed via at least one of the WPAN data radio and the IrDA communication port to a computer associated with the consignee.

Yet another advantageous aspect of the present invention comprises a portable data acquisition device adapted to interact with a user. Such a device includes a GPS sensor configured to determine a geographic location of the user and a signature capture window display configured to receive a signature of the user. A processor is configured to compare the signature of the user to a list of authorized signatures for the geographic location of the user so as to verify a signature authority of the user.

Still another advantageous aspect of the present invention comprises a system for a portable electronic device implementing a Windows™ CE operating system, wherein the system is configured to protect data entries into the portable electronic device. Such a system includes a random access memory module for temporarily storing the data entries, a permanent memory module in communication with the random access memory module and configured to permanently store selected ones of the data entries, and an intermediate memory module in communication with the random access memory module and the permanent memory module, wherein the intermediate memory module is configured to be non-volatile and capable of permanently storing the data entries.

Yet another advantageous aspect of the present invention comprises a method of protecting data entries associated with an event and received by a portable electronic device implementing a Windows™ CE operating system. First, the data entries are received in a random access memory module and in an intermediate memory module, both operably engaged with the portable electronic device. Selected ones of the data entries are then transferred, upon completion of the event, from at least one of the random access memory module and the intermediate memory module to a permanent memory module operably engaged with the portable electronic device, for permanent storage thereof.

Another advantageous aspect of the present invention comprises a method of retrieving specific data from a private database of a customer using a portable electronic device having a wireless local area network (WLAN) data radio, a wireless personal area network (WPAN) data radio, a wireless wide area network (WWAN) data radio, and an Infrared Data Association (IrDA) communication port operably engaged therewith. First, communication with a computer device housing the private database is established and the private database accessed via at least one of the WPAN data radio and the IrDA communication port. The specific data from the private database is then determined and received at the portable electronic device.

Still another advantageous aspect of the present invention comprises a method of selecting a data radio from a wireless local area network (WLAN) data radio, a wireless personal area network (WPAN) data radio, and a wireless wide area network (WWAN) data radio operably engaged with a portable electronic device. First, a task to be performed by the portable electronic device is determined and the task then associated with one of the data radios according to a matching criteria, before the data radio associated with the task is actuated.

A further advantageous aspect of the present invention comprises a tool capable of being operably engaged with and extracting data from a portable electronic device having an operating system, a processor, a Flash Memory module, an NVRAM module, a Wireless Local Area Network (WLAN) data radio, and an Infrared Data Association (IrDA) communication port. Such a data extraction tool includes a communication port configured to communicate with the portable electronic device via at least one of the WLAN data radio and the IrDA communication port, and a processing portion configured to selectively locate and extract data from at least one of the Flash Memory module and the NVRAM module, independently of the processor and the operating system.

Yet another advantageous aspect of the present invention comprises a method of regulating a battery pack for a portable electronic device having at least one of an application program interface (API) and software capable of directing interaction with the battery pack. First, a condition of the battery pack, having a charge of power, is monitored and then the power from the battery pack is allocated so as to optimize usage of the charge. Recharging of the battery pack is then directed independently of instructional input from an external recharging station.

Another advantageous aspect of the present invention comprises a method of determining a capacity of a battery for a portable electronic device. First, data associated with typical operational conditions of the portable electronic device during a shift is analyzed. A task-specific battery power usage profile for the portable electronic device during the shift is then developed. The battery capacity is then optimized according to the power usage profile, wherein the battery capacity corresponding to power required by the electronic device during the shift.

Still another advantageous aspect of the present invention comprises a method of testing an impact durability of a container, wherein the container being generally defined by a longitudinal axis and a lateral axis disposed perpendicularly thereto. First, the container is released from a height above a surface such that gravity directs the container in a vertical direction toward impact with the surface. The container is simultaneously directed in a horizontal direction such that the container impacts the surface with a velocity having a vertical component and a horizontal component. In some instances, the container may also be simultaneously rotated about at least one of the longitudinal and lateral axes.

Yet another advantageous aspect of the present invention comprises, in a portable electronic device having a longitudinal axis generally adapted to be directed at a user, a data entry keypad adapted to receive input from a pair of thumbs while the corresponding hands are grasping and supporting the device. Such a keypad includes a plurality of V-shaped rows of keys, wherein the keys are disposed on a face of the portable electronic device within a natural range of motion of the thumbs when the portable electronic device is grasped by the hands. Each V-shaped row has an apex disposed within a central region of the face and directed at the user, wherein the central region is disposed along the longitudinal axis. Each V-shaped row further includes opposing distal ends extending outwardly of the apex and directed away from the user. The keys are disposed on the face and with respect to the central region so as to minimize rotation of the portable electronic device about the longitudinal axis upon actuation of the keys by the thumbs.

A further advantageous aspect of the present invention comprises a method of stabilizing a portable electronic device having a keypad as the keypad is typed upon with a pair of thumbs, wherein the device includes a longitudinal axis generally adapted to be directed at a user and a plurality of keys in the keypad for entering data into the portable electronic device with the user's thumbs as the portable electronic device is grasped by the user's hands. First, the keys are positioned in a plurality of V-shaped rows, with each V-shaped row having an apex disposed within a central region and directed at the user, wherein the central region is disposed along the longitudinal axis. Each V-shaped row further includes opposing distal ends extending outwardly of the central region and directed away from the user. Each off-apex key is separated from the central region by a distance, wherein minimizing the distance between each of the off-apex keys and the central region thereby minimizes rotation of the portable electronic device about the longitudinal axis upon actuation of the off-apex keys by the thumbs.

Another advantageous aspect of the present invention comprises, in a portable electronic device, a data entry keypad adapted to receive input from a gloved digit of a hand, wherein the keypad is disposed upon a face of the device. Such a keypad includes a plurality of keys each having a center and separated by a key pitch distance, wherein the key pitch distance is a center-to-center distance between adjacently-disposed keys. The key pitch distance is selected to facilitate actuation of each key by the gloved digit without actuating an adjacently-disposed key on the keypad.

Still another advantageous aspect of the present invention comprises a portable electronic device having a top face and a bottom face, wherein such a portable electronic device includes an actuator adapted to receive input from an index finger of a hand while the hand is grasping the device, the actuator being disposed on the bottom face of the portable electronic device so as to be naturally accessible by the index finger.

Another advantageous aspect of the present invention comprises a portable data acquisition device including a data input device, a memory, a data storage device, a data transmission device, an actuator, and a casing. The casing is configured for containing the data input device, the memory, the data storage device, and the data transmission device. The casing is further configured to be substantially resistant to moisture intrusion and comprises a continuous membrane defining at least one opening configured to receive the actuator. The membrane is configured to operably engage the actuator so as to substantially prevent moisture intrusion into the casing about the actuator.

Yet another advantageous aspect of the present invention comprises a portable electronic device and holder assembly. Such an assembly includes a holder adapted to be attached to a user, wherein the holder has a first end, an elongate arm extending from the first end to an opposing second end, a hook operably engaged with the second end of the arm, wherein the hook has a tine separated from the arm by a span, and a gate having a hinged end rotatably engaged with a pair of rails spaced inward from the second end and a free end extending across the span to the tine, wherein the free end is biased toward the tine by a biasing device operably engaged between the arm and the gate. The span, the arm, the tine, and the gate of the holder are configured to receive and secure a pin therein. The pin is operably engaged with the portable electronic device, and spans a channel defined thereby, and, as such the portable electronic device is secured to the holder. A pair of shoulders on an edge of a casing of the portable electronic device defines the channel and has the pin operably engaged therebetween. The shoulders are configured with respect to the edge of the casing such that the gate is urged away from the tine and toward the arm when the portable electronic device is rotated about the pin and over the tine, toward the first end of the holder. The pin is thereby removable from the span so as to disengage the portable electronic device from the holder.

Yet another advantageous aspect of the present invention comprises a holder adapted to be attached to a user and capable of being operably engaged with a portable electronic device. The device includes a pair of shoulders on an edge of a casing thereof, wherein the shoulders cooperate to define a channel and have a pin operably engaged therebetween. Such a holder includes a first end, an elongate arm extending from the first end to an opposing second end, and a hook operably engaged with the second end of the arm, wherein the hook has a tine separated from the arm by a span. A gate has a hinged end rotatably engaged with a pair of rails spaced inward from the second end, and a free end extending across the span to the tine. The free end is biased toward the tine by a biasing device operably engaged between the arm and the gate. The span is configured to receive the pin therein, wherein the pin is securable between the arm, the tine, and the gate so as to thereby secure the portable electronic device to the holder. The shoulders are configured with respect to the edge of the casing so as to urge the gate away from the tine and toward the arm when the portable electronic device is rotated about the pin and over the tine, toward the first end of the holder. The pin is thereby removable from the span so as to disengage the portable electronic device from the holder.

Yet another advantageous aspect of the present invention comprises a method of non-visually determining a relation of a portable electronic device to a holder, wherein the holder includes a hook operably engaged with one end of an arm. The hook further includes a tine separated from the arm by a span. A gate has a hinged end in rotatable communication with a pair of rails operably engaged with the arm, and a free end extending therefrom across the span to the tine, wherein the free end is biased toward the tine by a biasing device. The portable electronic device has a pin operably engaged therewith, wherein the pin is configured to removably engage the holder so as to secure the portable electronic device thereto. Accordingly, such a method comprises providing at least one of an auditory alert and a tactile cue to a user as the pin is guided into the span of the hook and secured therein via cooperation of the arm, the tine, the gate, and the biasing device.

Another advantageous aspect of the present invention comprises a portable electronic device including an elongate stylus having an actuation end, a medial portion, and a distal end, wherein the medial portion defines a circumferential groove. A casing defines a recess configured to receive and house the actuation end of the stylus, wherein the recess extends to a channel defined by the casing. The channel is configured to receive the medial portion of the stylus, while the recess and the channel are configured to cooperate to receive the stylus such that the distal end extends from the groove and outwardly of the casing. A retaining mechanism is operably engaged with the channel in correspondence with the circumferential groove defined by the medial portion of the stylus, wherein the retaining mechanism is configured to operably engage the circumferential groove so as to removably secure the stylus to the casing.

Yet another advantageous aspect of the present invention comprises a portable electronic device defining a longitudinal axis generally adapted to be directed at a user and adapted to be grasped and operated by the user's hands. Such a portable electronic device includes a casing for containing a data input device, a memory, a data storage device, and a data transmission device, wherein the casing is configured to be substantially resistant to moisture intrusion and comprises a substantially continuous membrane defining at least one opening. An actuator, adapted to receive input from an index finger of a hand while the hand is grasping the device, is disposed on a bottom face of the casing, in the at least one opening, so as to be naturally accessible by the index finger. The actuator is configured to operably engage the membrane so as to substantially prevent moisture intrusion into the casing about the actuator. A main display having a major dimension and a minor dimension is operably engaged with a top face of the casing such that the major dimension is perpendicular to the longitudinal axis of the case. A keypad including a plurality of keys is disposed on a top face of the casing so as to be capable of being engaged with a thumb of each hand when the casing is grasped by the user's hands.

Another advantageous aspect of the present invention comprises a portable data acquisition device capable of collecting, storing and transmitting data. Such a device includes a casing and a wireless local area network (WLAN) data radio, a wireless personal area network (WPAN) data radio, and a wireless wide area network (WWAN) data radio housed by the casing. In addition, the device includes at least one of a processor, a real-time clock, a memory, a keypad, a touch screen, a graphic digitizer, a scanner, an audio capturing device, a video capturing device, a receiver, a transmitter, a sensor, a switch, a display, a speaker, an indicator, an alert device, an acoustic modem and dialer, a cellular telephone, a hard copy printing device, a stylus, a battery charging indicator, a battery, a battery interface, a battery charger, a battery tester, a battery charging indicator, a battery level indicator, a power management processor, an Infrared Data Association (IrDA) communication port, a global positioning system (GPS) sensor, an operating system, a diagnostic system, an application software loader, a systems software loader, a database, a database manager, and an application program interface (API), operably engaged with the casing.

Thus, embodiments of the present invention meet the needs in the art and provide significant advantages as detailed herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 1A-1E, 2-8, and 9A-9E illustrate various views of a portable data acquisition device according to one embodiment of the present invention;

FIGS. 13A-13D illustrate an operational sequence for a portable data acquisition device being disengaged from a device holder, according to one embodiment of the present invention;

DETAILED DESCRIPTION OF THE INVENTION

Figure 1:
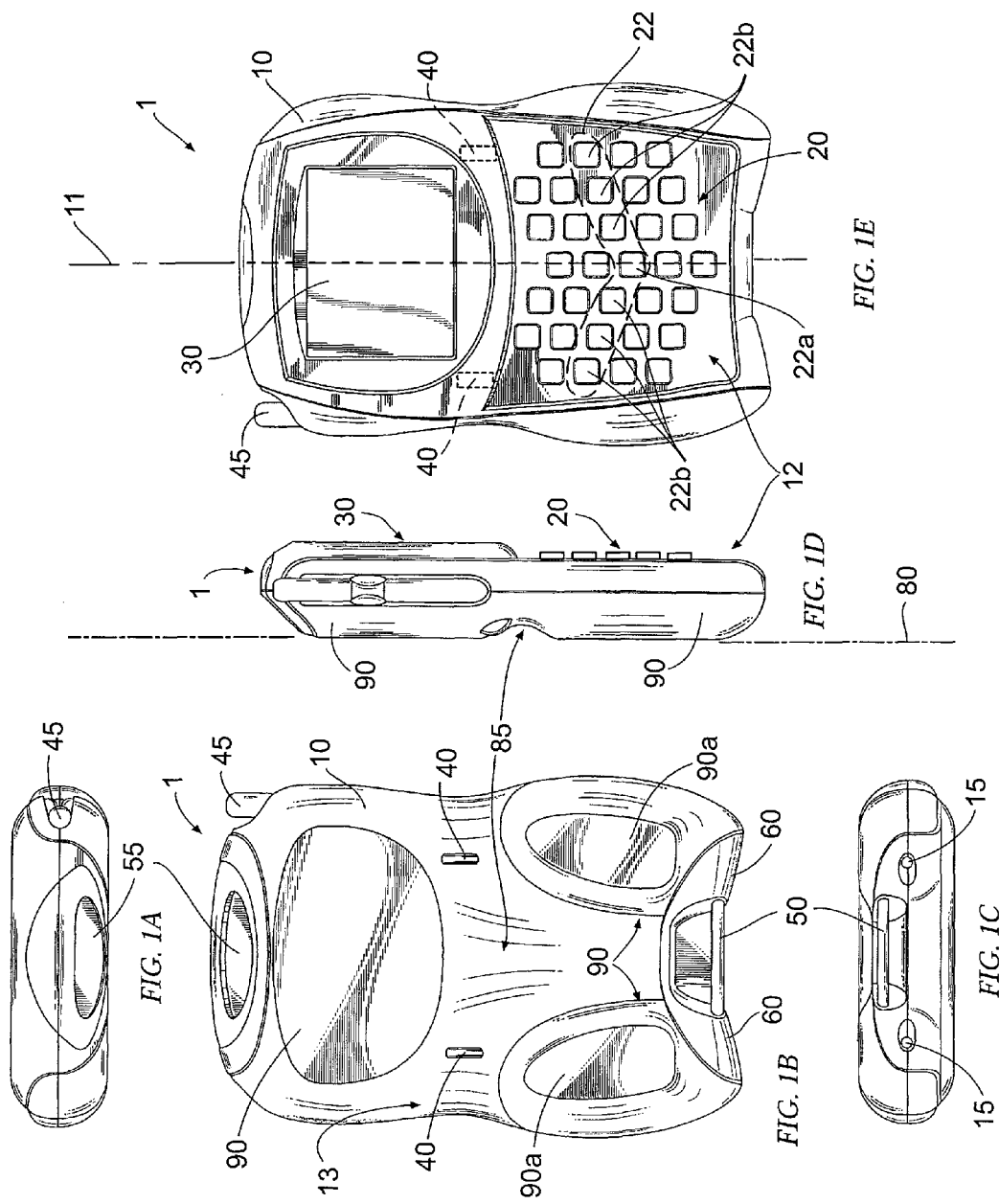
Figure 2:
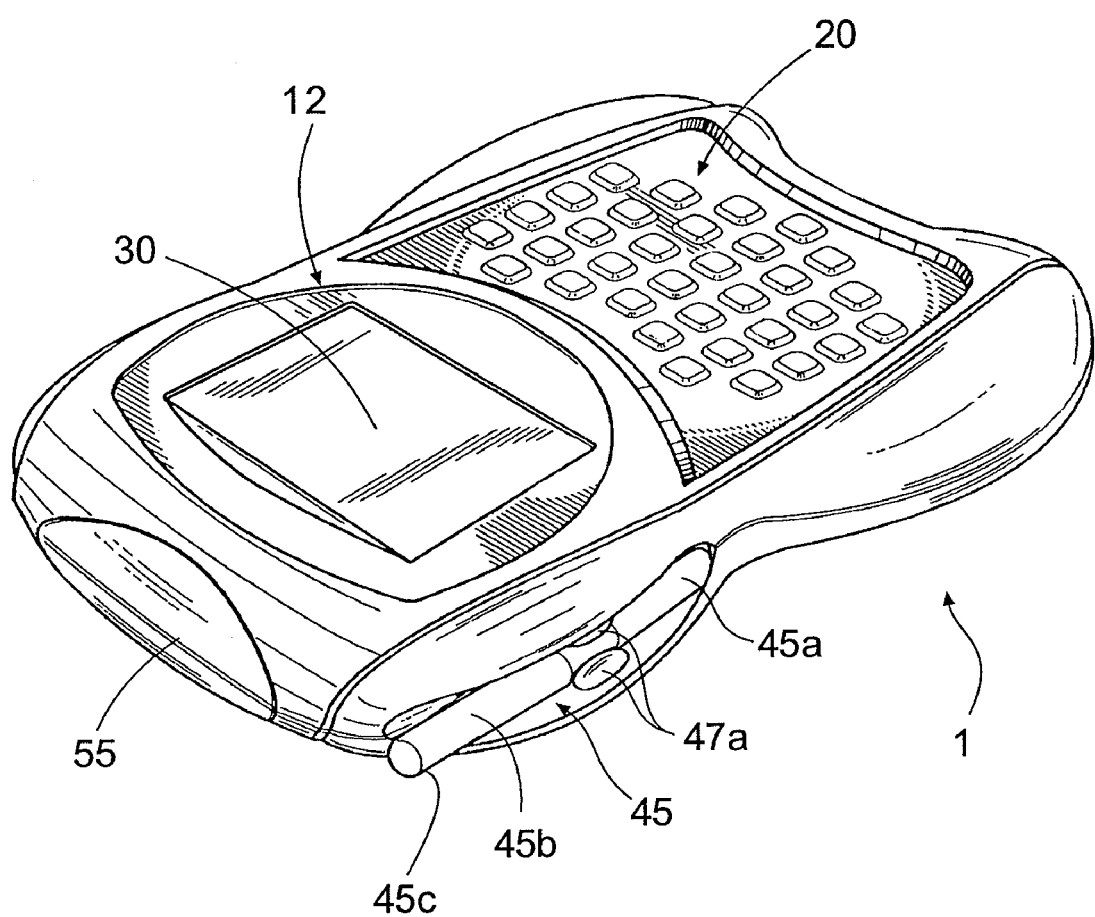
Figure 3:
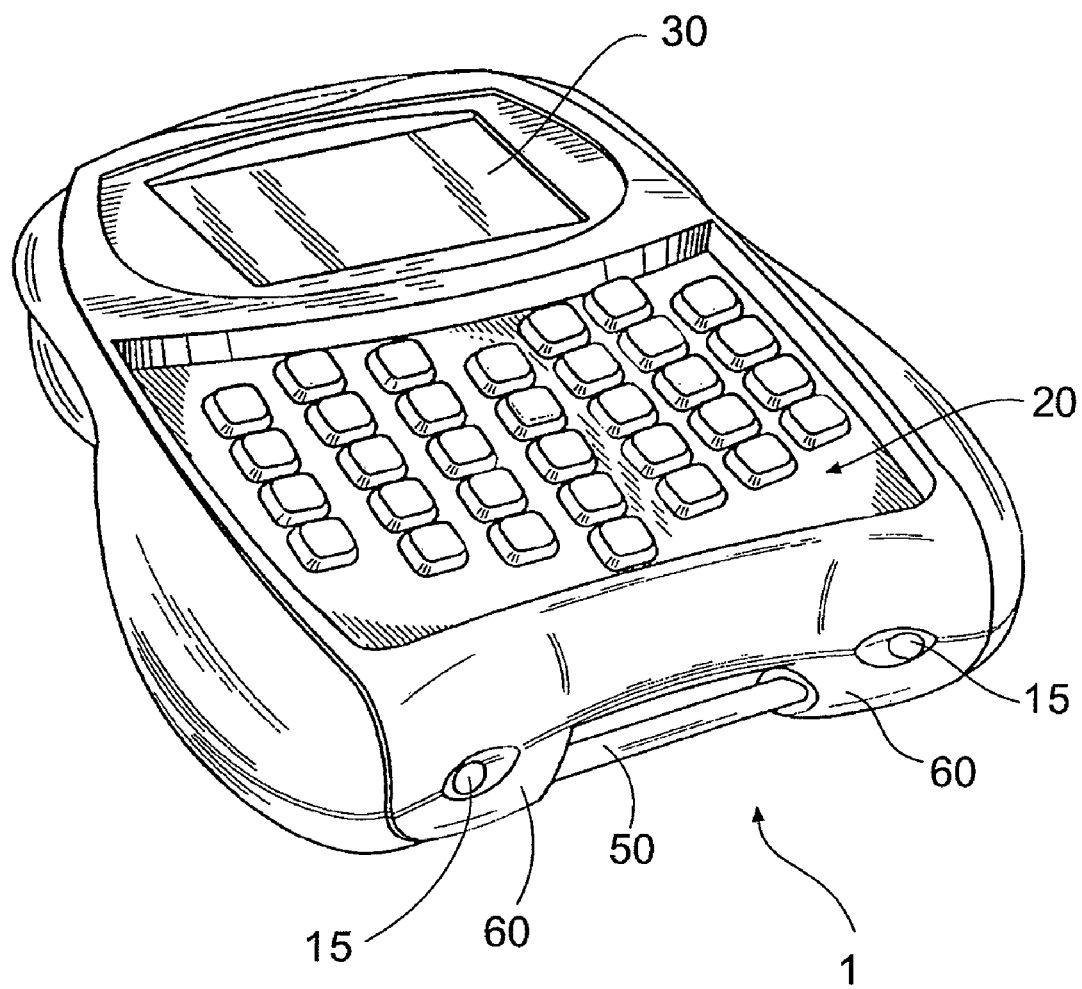
Figure 4:
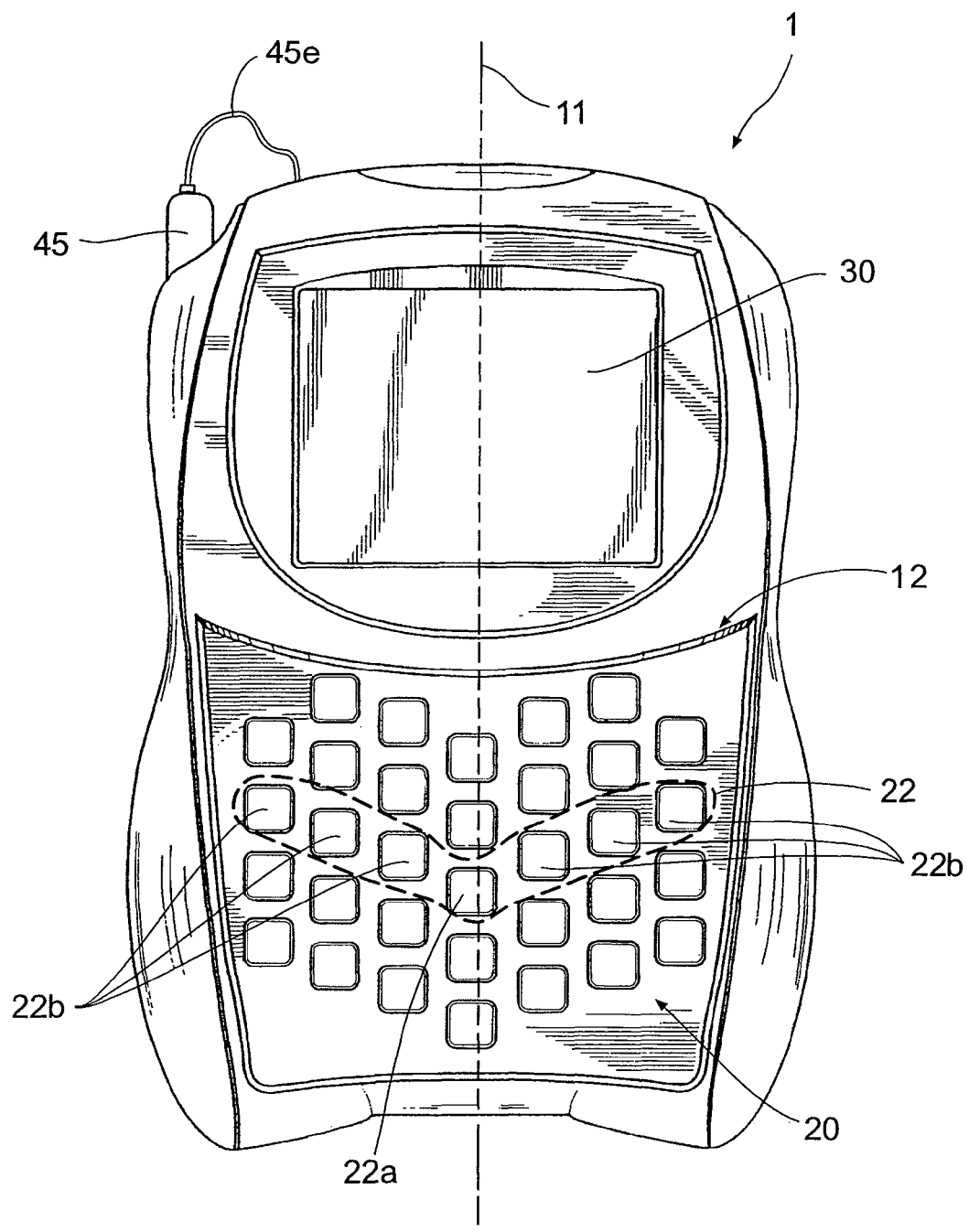
Figure 5:
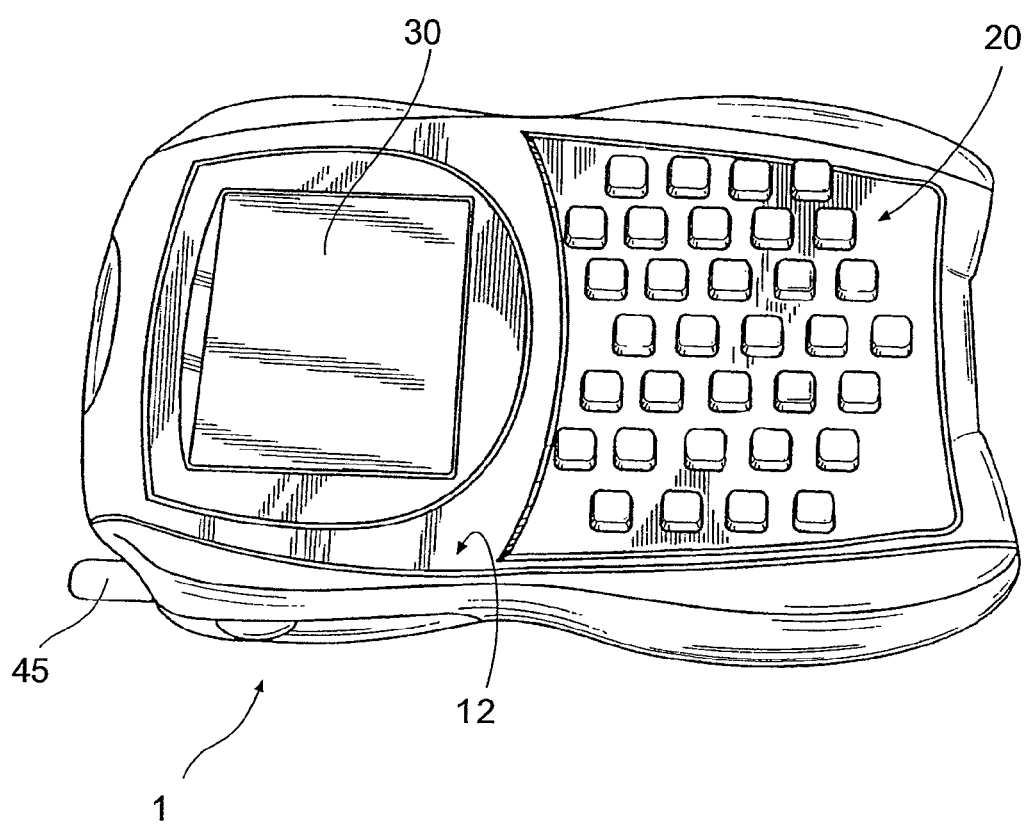
Figure 6:
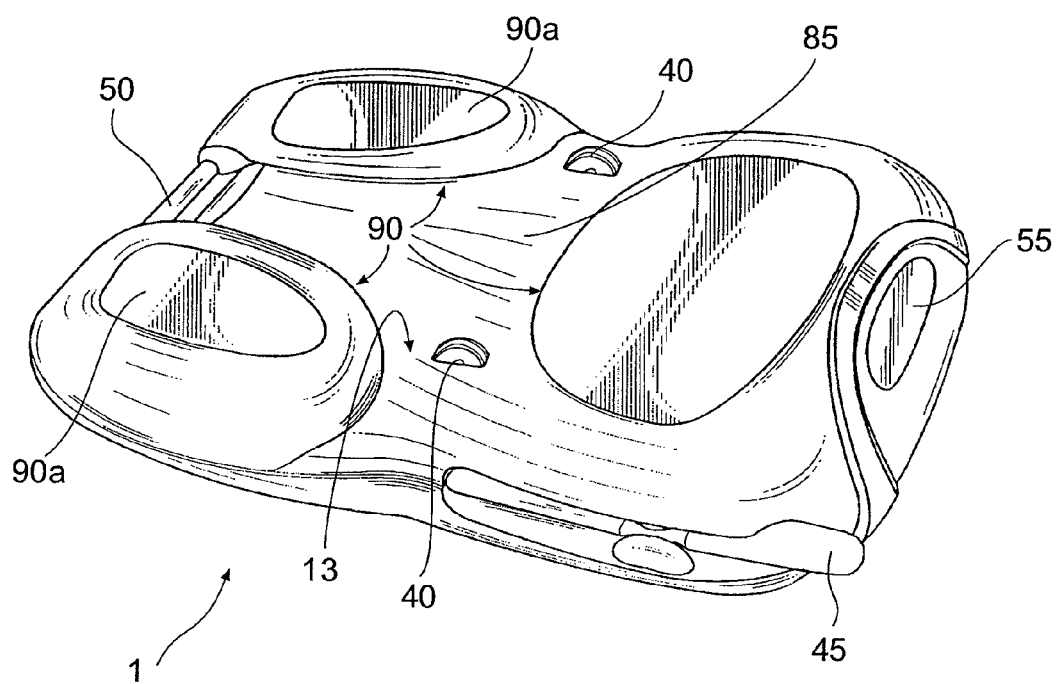
Figure 7:
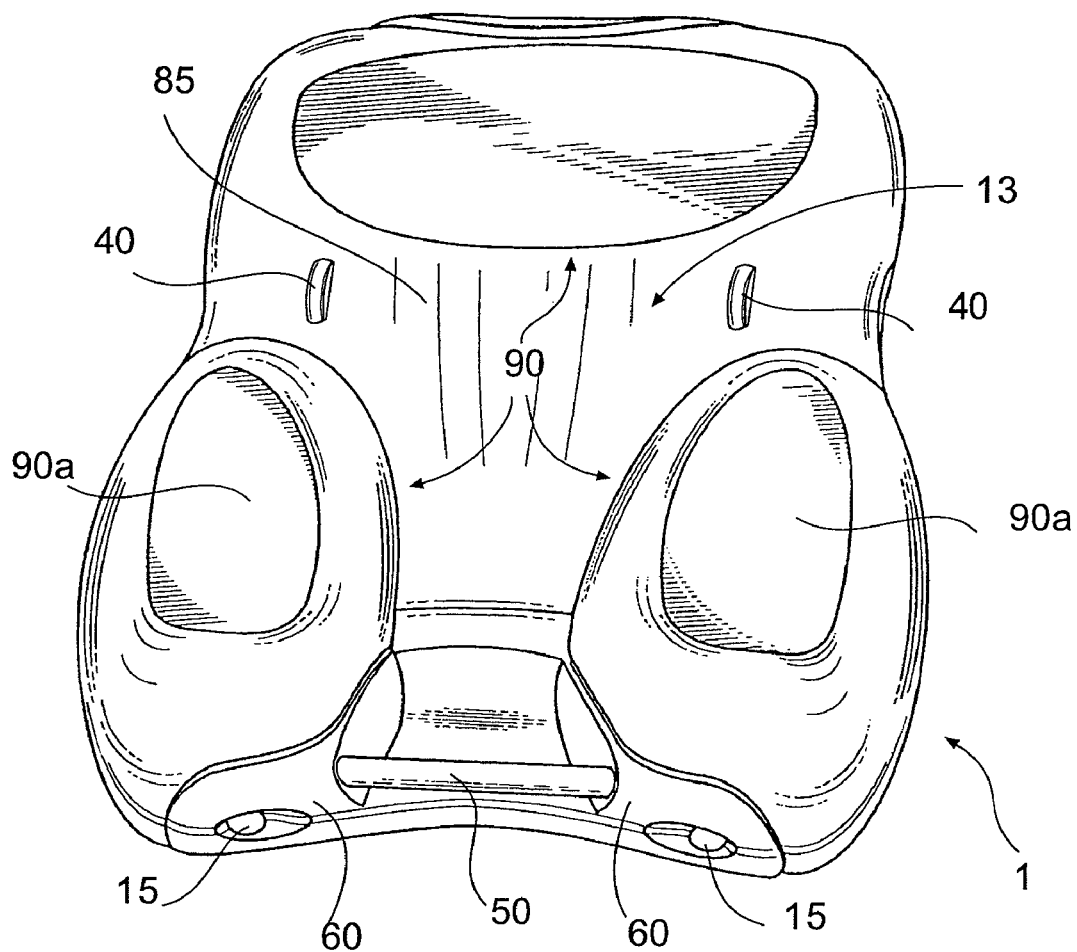
Figure 8:
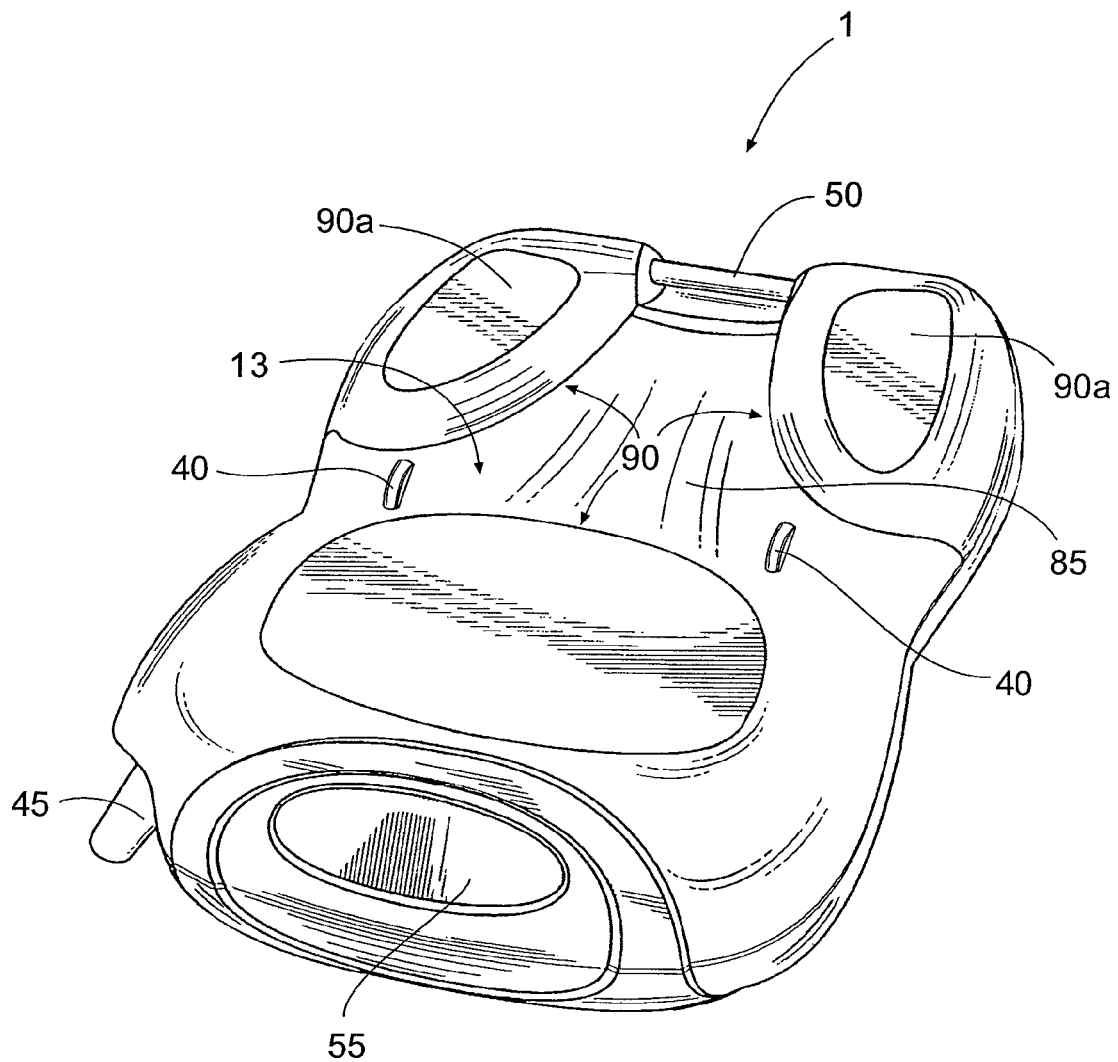
Figure 9:
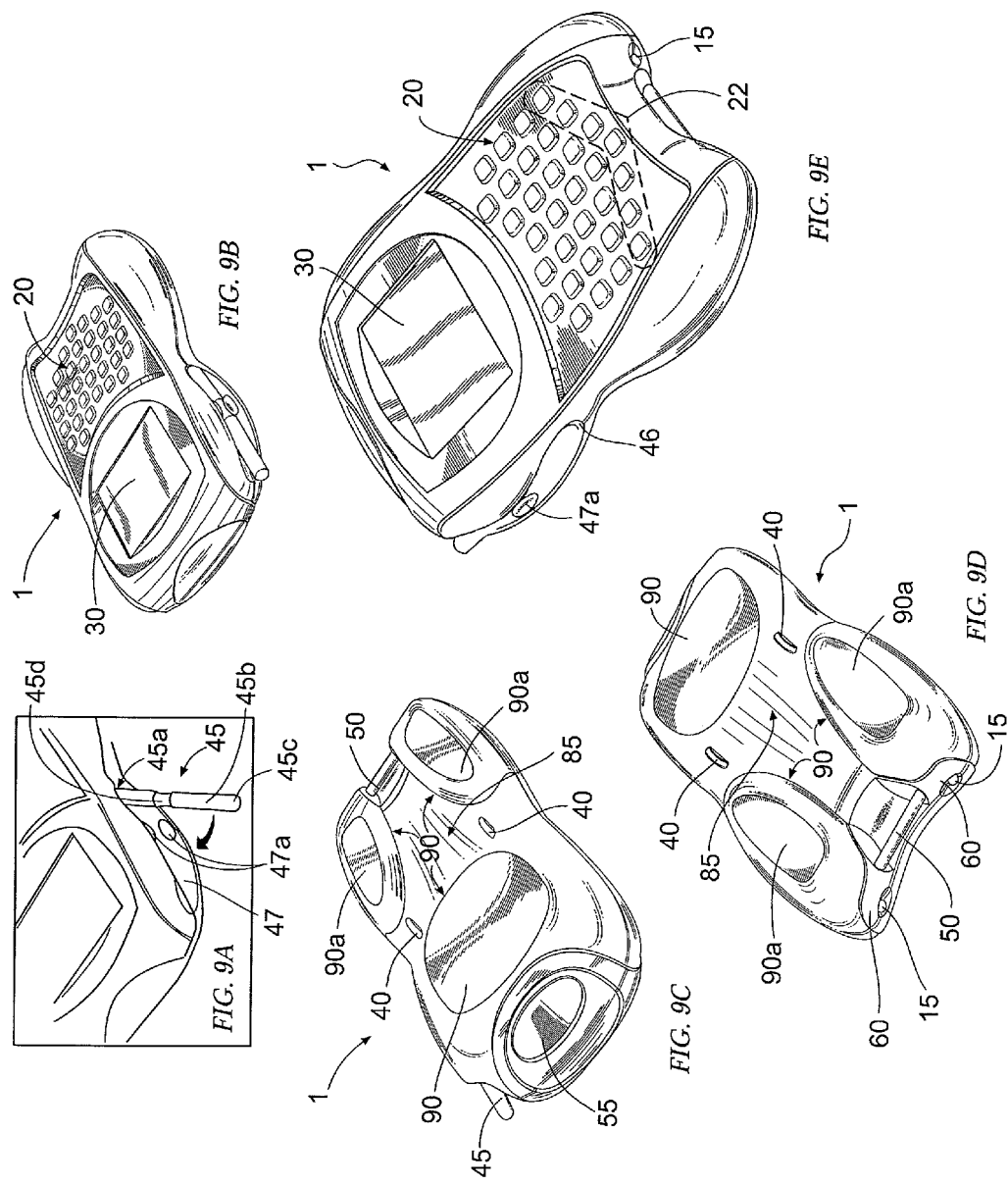

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIGS. 1A-1E, 2-8, 9A-9E, and 22-24 show various views of a portable data acquisition device according to one embodiment of the present invention, the device being indicated generally by the numeral 1. As explained in greater detail herein, the device 1 is generally configured to collect package tracking data, typically at a distribution center, at the package delivery location, and in various locations therebetween or otherwise, to store the package tracking data, and to forward the package tracking data to a mainframe data repository 200 via one of several communication devices and methods. The device 1 generally includes a casing 10, a keypad 20, and a display 30. The casing 10 includes a longitudinal axis 11 and the keypad 20 and display 30 are arranged on a top surface 12 of the casing 10 and with respect to longitudinal axis 11 so as to be usable by a user when the longitudinal axis 11 is directed at the user. The display 30 is generally rectangular, though other shapes may be used for the display 30 in some instances, as includes a major dimension and a minor dimension. In some instances, the display 30 may be configured in a "landscape" orientation with respect to the casing 10 such that the major dimension of the display 30 is perpendicular to the longitudinal axis 11. Accordingly, more data about a particular item or delivery may be displayed on a continuous line across the display 30. For example, the device 1 and the display 30 may be configured such that data from a single delivery, once entered into the device 1, may be displayed on one continuous line across the display 30.

According to one advantageous embodiment of the present invention, the keys comprising the keypad 20 are disposed on the top surface 12 of the device 1 in a plurality of V-shaped rows 22. Each V-shaped row 22 is defined by an apex key 22*a* disposed about the longitudinal axis 11, with the off-apex keys 22*b* extending outwardly from and along the longitudinal axis 11 on either side of the apex key 22*a*. However, in some instances, the apex key 22*a* may be disposed in a central region (not shown), the central region being disposed along the longitudinal axis 11, such that the apex key 22*a* is not necessarily centered on the longitudinal axis 11. In such instances, the off-apex keys 22*b* would extend from the apex key 22*a* in the central region. Further, when the device 1 is held by the user with two hands, the keys within each V-shaped row 22 lie within the natural range of motion of the two thumbs so as to allow "thumb typing". The location of each key on the keypad 22, including the distance of each key from the side edges of the casing 10, is preferably configured to accommodate use by an average size hand without excessive reaching by the thumbs. Accordingly, the apex key 22*a* is closer to a reaching thumb when placed at the apex of the V-shaped row 22 than if it were placed at the center of a straight row. In some instances, the keypad 20 may be arranged such that the alphanumeric and some function keys are within the easiest and most natural reach of the thumbs, while lesser-used keys, such as some lesser-used function keys, are more remotely disposed from the thumbs, but also within reach thereof. In other instances, the keypad 20 is arranged such that the alphanumeric keys remain substantially visible to the user during alternating thumb typing by the user. According to another aspect of the present invention, in some instances, the size, shape, and other parameters of the keys on the keypad 20 are optimized for users wearing gloves. That is, for gloved-hand operation, the keys are sized and have a key pitch distance (the center-to-center separation distance between adjacently-disposed keys) that allows each key to be actuated by a gloved thumb without interfering with or unintentionally actuating an adjacently-disposed key. The key pitch distance may range between about 0.4 inches and about 0.9 inches, though, in one embodiment, the preferred key pitch distance is about 0.7 inches (about 1.5 cm).

According to yet another advantageous aspect of the present invention, the keypad 20 may also be optimized so as to minimize rotation of the device 1 about the longitudinal axis 11 while the user is thumb typing on the keypad 20. In part, the V-shaped rows 22 of keys accommodate the natural rocking motion of the device 1 during the task of alternating thumb typing. In use, the device 1 rocks gently back and forth about the longitudinal axis 11 as the user exerts force on the keys with alternating thumbs. Actuation of the keys on or close to the longitudinal axis 11 produces a mild rocking motion, while actuation of the outermost keys may produce a more pronounced rocking motion. Thus, the V-shape of the rows 22 of keys allows each key to be disposed closer to the longitudinal axis 11 and thereby lowers the effective lever distance between the longitudinal axis 11 of the device 1 and the key being actuated. Accordingly, the amount of rotation about the longitudinal axis 11 imparted to the device 10 during thumb typing is reduced. In other words, a straight row of keys extending across the casing would be longer than the V-shaped row 22 and would require the user to actuate keys much further away from the longitudinal axis 11, thereby causing a greater rotation and a more pronounced rocking of the device 1 about the longitudinal axis 11. As such, the resulting excessive rocking could interfere with efficient use of the device and correct typing thereon. Accordingly, placement of the keys in V-shaped rows 22 locates the keys closer to the longitudinal axis 11 of the device 1 and thereby minimizes the rocking motion of the device 1 during typing. One skilled in the art will also note that the configuration of the casing 10 in a rounded, approximately hourglass shape provides a rounded surface about the keypad 20 which further assists in minimizing the rocking motion of the device 1. The rounded surface, for instance, allows the thumbs to move inward toward the keypad 20 about the uppermost and lowermost keys on the keypad 20, thereby requiring less contortion of the hands and thus less rocking of the device 1.

Figure 24:
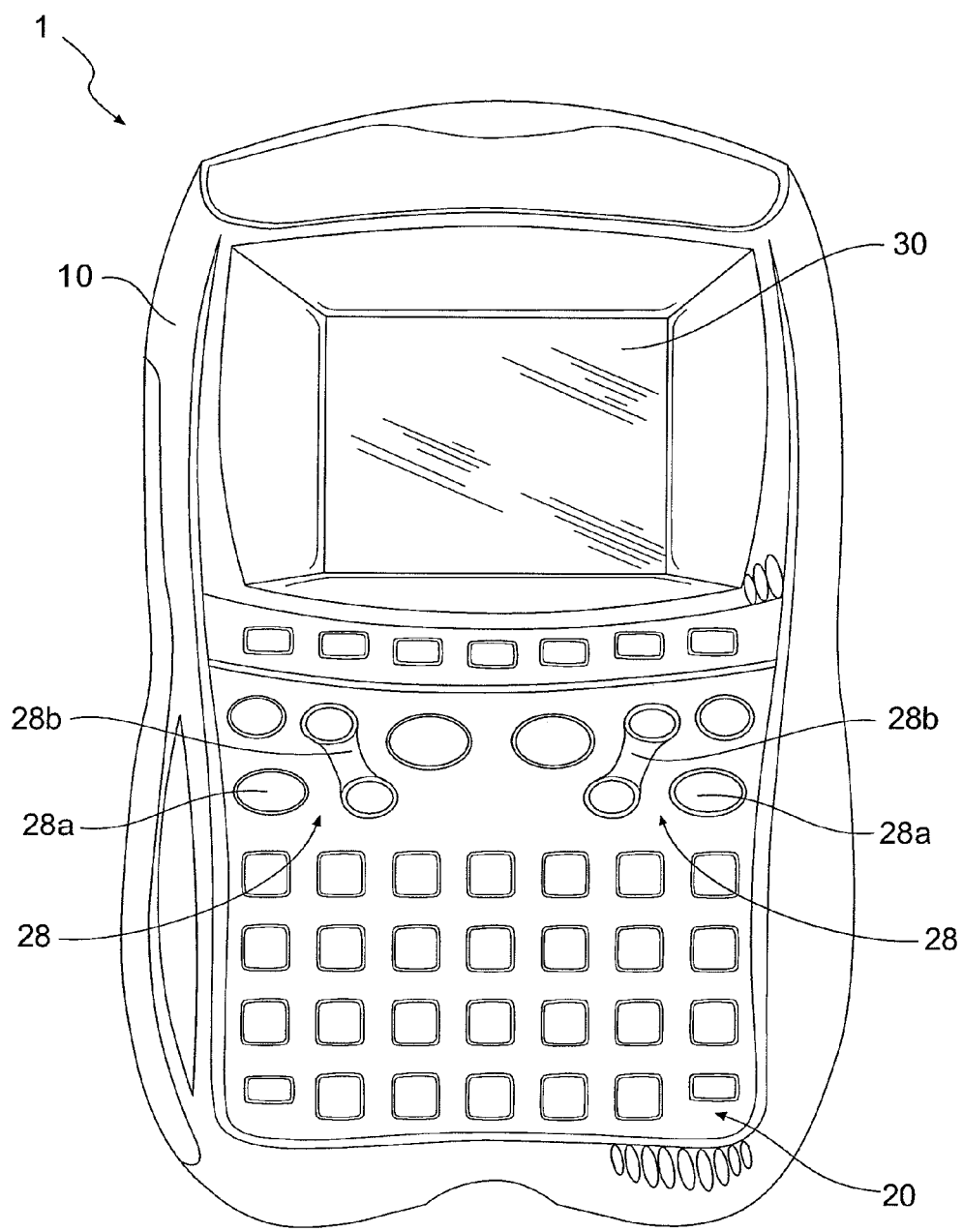
FIG. 24 illustrates a portable data acquisition device according to an alternate embodiment of the present invention.

Some embodiments of the present invention may implement a keypad 20 having linear rows of keys as shown, for example, in FIG. 24. Further, in some alternate embodiments, as shown in FIG. 24, the keypad 20 may also include one or two sets of scan keys 28 configured to be operated by the thumbs of the user's hands for scrolling through text on the display 30 or for performing other input functions. Each set of scan keys 28 includes, for instance, one or more lateral scan keys 28a and one or more longitudinal or "up" and "down" keys 28b. However, one skilled in the art will appreciate that the function imparted by each set of scan keys 28 may also be implemented in different manners. For example, a roller, a joystick, or a rocker controller may be implemented and configured to provide the same or similar functionality. In instances where two sets of scan keys 28 are included, one set for each thumb, one-handed operation of the device 1 may be possible.

Since the environment in which the device 1 is operated may vary considerably, the keypad 20 and/or the display 30 may be configured so as to prevent moisture, for example, in the form of water or water vapor, dust, or other impurities from entering the casing 10 about that component. For example, the keypad 20 may further comprise a flexible membrane (not shown) extending over the keys, or the keys may comprise a flexible membrane, wherein the membrane may be comprised of silicone and is sealed to the casing 10 about the keys. In other instances, the keys may be comprised of silicone and configured to individually engage and form a seal with the casing 10. One skilled in the art will appreciate, however, that many different methods of preventing moisture or other contaminants from entering the casing 10 may also be implemented. Further, though the keypad 20 has been described herein in terms of individual actuatable keys, the keypad 20 may have many other configurations as will be appreciated by one skilled in the art. For example, the keypad 20 may be implemented in an electronic touch screen (not shown), which may be independent of or integral with the display 30. Such a touch screen may comprise, for example, a keypad superimposed on a CRT or on an LCD screen. In some instances, the display 30 may also be at least partially configured as a touch-sensitive screen where, for example, a portion of the display 30 may be configured as a signature capture window (not shown) as will also be appreciated by one skilled in the art and described further herein.

According to one embodiment of the present invention, the casing 10 of the device 1 includes a bottom surface 13 generally opposing the top surface 12. The bottom surface 13 further comprises a plurality of pads 90 extending outwardly therefrom. The pads 90 are configured to cooperate to define a bottom plane 80 on which the device 1 rests when placed on a surface. The bottom plane 80 may be generally parallel to the bottom surface 12 or may be angled with respect thereto such that, for example, the display 30 is tilted upwardly toward the user when the device 1 is placed on a flat surface. The device 1 may include pads 90 of any shape that is suited to the particular geometry or spatial needs of the device 1. As shown, according to one advantageous embodiment, the device 1 comprises a pair of grasping pads 90a disposed about opposite edges of the bottom surface 13 so as to be generally opposed to the keypad 20 on the top surface 12. The grasping pads 90a are configured such that, when the user's hands are grasping the device 1 such that the keypad 20 is in the natural range of motion of the thumbs, the other fingers of the hands will be able to naturally wrap about the respective grasping pads 90a so that the hands securely grasp the casing 10. The portions of the respective pads 90 defining the bottom plane 80 may also be textured or have a textured material applied thereto so as to facilitate a secure grasp by the user or to prevent the device 1 from sliding when placed on a surface.

According to another advantageous aspect of the present invention, the pads 90 extending from the bottom surface 13 of the casing 10 further cooperate to define an amorphous recess 85, wherein the term "amorphous" is meant to convey that the recess 85 need not have a definable geometric shape, but rather may be defined by a variety of curvilinear or rectilinear shapes, extending in all three dimensions, across the bottom surface 13 of the casing 10. The recess 85 includes all surfaces on the bottom surface 13 of the casing 10 which are recessed toward the casing 10 with respect to the bottom plane 80. Accordingly, as described further herein, various components, such as a scanner 55, a pin 50, and rotary switches 40 or other actuators may be located within the recess 85. According to one aspect, locating these and other components within the recess 85 protects the components from damage caused by surface moisture or physical impact or other contact with an external surface. Further, these components are also protected from unintentional actuation or other corruption caused by unintended motion or contact of the bottom surface 13 with external objects. The pads 90, thus arranged, provide a stable base for the device 1, while raising the device 1 above the surface upon which it rests and thereby providing protection for components disposed within the recess 85.

In one advantageous embodiment, the device 1 may further include one or more rotary switches 40 for scrolling through text on the display 30 or for performing other input functions, wherein such rotary switches 40 will be appreciated by one skilled in the art. Accordingly, a rotary switch 40 may be disposed within the recess 85 on the bottom surface 13 such that the user, while grasping the side edges of the casing 10 with both hands, with the thumbs within reach of the keys on the keypad 20 and the remaining fingers wrapped about the grasping pads 90a, may readily operate the rotary switch 40 with an index finger on the bottom face 13 of the casing 10. In some instances, the rotary switches 40 may also be sized, shaped, and/or textured to accommodate gloved-hand operation. In another aspect, because scrolling through text and menus may be one of the main operations performed by the user, the index finger location on the bottom surface 13, as determined at least in part by the configuration of the grasping pads 90a, may also be configured as "anchor points" to place the hands of the user in proper positions with respect to the device 1. Further, other switches or actuators may be placed about the index finger locations so as to increase the flexibility of the device 1 and expand the operations that may be performed by the index fingers.

As shown, one or more rotary switches 40 are located within the recess 85 on the bottom surface 13 of the casing 10 at locations where the respective rotary switch 40 corresponds to the natural location of the user's index finger when grasping the device 1 with both hands. The rotary switches 40 are disposed within the recess 85 at least partially to prevent damage and to avoid accidental actuation thereof. When the device 1 is placed with the bottom plane 80 on a surface, the rotary switches 40 and other components within the recess 85 will be spaced apart from that surface. If the device 1 is placed, for example, on a table on the bottom plane 80 defined by the pads 90, the recessed location of the rotary switches 40 may prevent accidental actuation or damage thereto. Likewise, if the device 1 is placed, for example, with the top surface 12 down on the top of a package, the pads 90 on the exposed bottom surface 13 of the device 1 may also protect the rotary switches 40 from accidental actuation.

Figure 21:
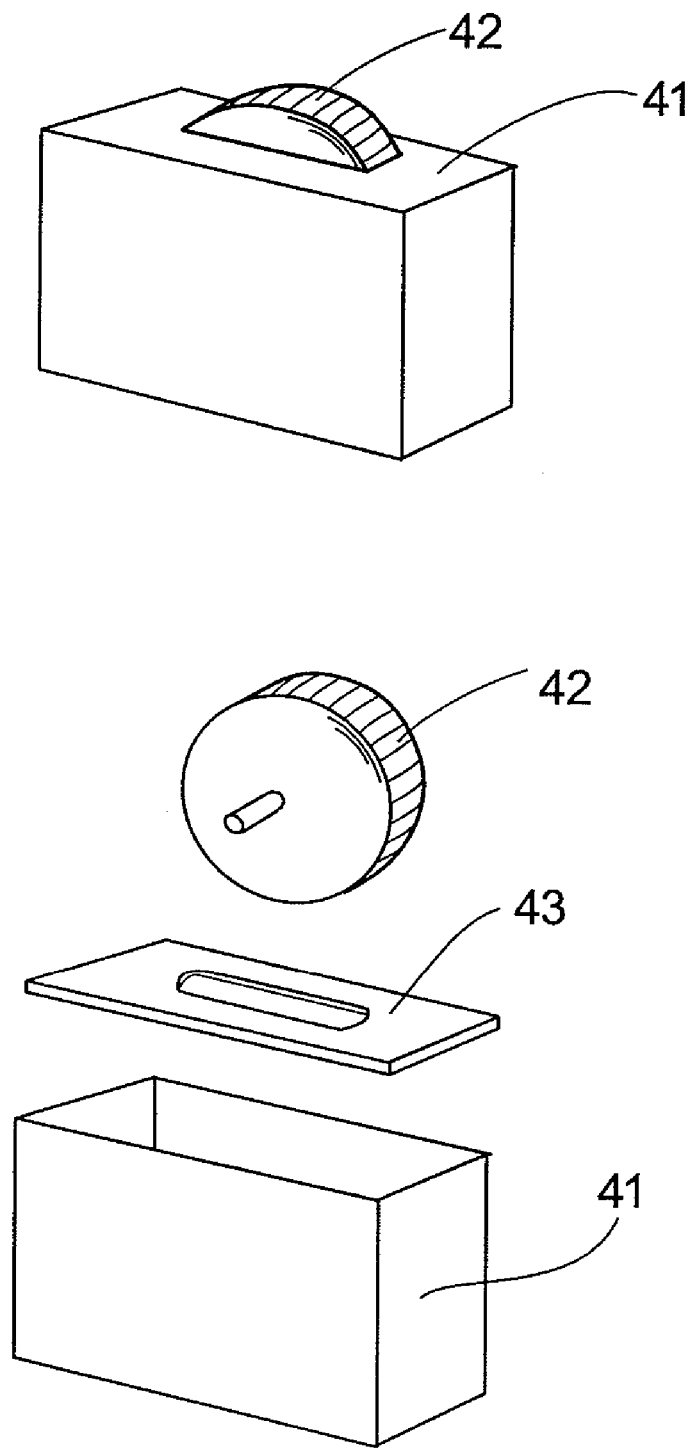
FIG. 21 illustrates an assembly view and an exploded view of a roller switch according to one embodiment of the present invention.

However, since the rotary switches 40 are installed in the casing 10, measures must also be undertaken to prevent moisture intrusion into the casing 10 through or about the rotary switches 40. Such a rotary switch 40, as shown in FIG. 21, typically comprises a housing 41 and a roller element 42 disposed at least partially within the housing 41. Accordingly, the housing 41 may be configured to engage the casing 10 so as to prevent moisture intrusion into the casing about the housing 41. For example, a seal (not shown) may be disposed between the housing 41 and the casing 10 so as to seal out moisture. In another embodiment, a water-resistant rotary switch 40 may be provided by a grommet 43 operably engaged between the housing 41 and the roller element 42, the roller element 42 comprising, for example, a ball, a dial, or the like. Such a grommet 43 would cooperate with the roller element 42 so as to allow the roller element 42 to freely rotate, while protecting the housing 41 and the casing 10 from water intrusion. In some instances, the moisture resistance of the rotary switch 40 may be accomplished through the configuration of the housing 41 immediately adjacent to the roller element 42, with or without the grommet 43. In still other instances, the housing 41 may be configured to be sealed such that, when engaged with the casing 10, a moisture resistant seal is formed. As such, the roller element 42 may then be configured to form a switch with the housing 41. That is, the housing 41 may include a first switch portion (not shown), while the roller element 42 would include or comprise a corresponding second switch portion (not shown). The respective switch portions may be configured to cooperate to form a switch mechanism through, for example, electrical, mechanical, and/or magnetic arrangements. One skilled in the art will thus appreciate that many different forms of water-resistant rotary switches 40 may be provided. Such water-resistant rotary switches 40 are therefore protected against, for example, rain, splashed water from any direction, and ambient humidity, and also serve to protect the casing 10 from moisture intrusion.

In some embodiments, such rotary switches 40 may not necessarily be implemented in the device 1. For example, the functionality of such rotary switches 40 may be accomplished through the use of other devices capable of being actuated by the index fingers such as, for example, a roller, a joystick, or a rocker controller, as will be appreciated by one skilled in the art. However, in still other instances, the functionality of the rotary switches 40 may be obviated by, for example, the use of scan keys 28, wherein the scan keys 28 may be incorporated into the keypad 20 for actuation by the user's thumbs or disposed within the recess 85 for actuation by the user's index fingers. Thus, one skilled in the art will appreciate that many different configurations of actuators may be implemented for scrolling through text and other input function as described herein with respect to, for example, the roller switches 40 and the scan keys 28.

According to some advantageous aspects of the present invention, the device 1 may further include or be capable of housing a stylus 45 for performing various functions with respect to the device 1. For example, the device 1 may comprise a signature capture window (not shown) integral with or separate from the display 30, wherein such a signature capture window will be appreciate by one skilled in the art as being capable of electronically capturing writing by the stylus 45 on a touch-sensitive screen. Alternatively, the stylus 45 may be configured to interact with the keypad 20 or, for example, may merely comprise a writing instrument such as a pen or pencil. Since such a separate component associated with the device 1 may be prone to being misplaced or lost, the device 1 may, in some instances, include a tether 45e (FIG. 4) connecting the stylus 45 to the casing 10. In other instances, the casing 10 may be configured to house and secure the stylus 45 when the stylus 45, having an actuation end 45a, a medial portion 45b, and a distal end 45c, is not in use. More particularly, the casing 10 may define a recess 46 along a side of the casing 10, the recess 46 extending to an elongate channel 47, also along the side of the casing. The recess 46 and the channel 47 are configured to cooperate to receive the stylus 45 therein, such that the actuation end 45a is disposed in the recess 46 while the medial portion 45b of the stylus 45 is housed by the channel 47 and the distal end 45c extends beyond the channel 47 so as to facilitate removal of the stylus 45 for use with the device 1. In some instances, the medial portion 45b of the stylus 45 may include a circumferential groove 45d configured to engage a retaining mechanism, such as a pair of flanges 47a, engaged with the channel 47 in correspondence with the circumferential groove 45d and for securing the stylus 45 within the channel 47. Such flanges 47a may be, for example, comprised of a flexible material or otherwise configured with respect to the circumferential groove 45d to facilitate engagement and disengagement of the stylus 45 with respect to the casing 10. For example, the flanges 47a may be configured such that the stylus 45 engages the channel 47 in a snap fit, a friction fit, or in any other suitable manner.

As will be further described herein, one skilled in the art will also appreciate that portable electronic devices typically include sensitive components wherein the components and/or the casing 10 may become damaged if the device 1 is dropped by the user. As such, it would be desirable to test the impact durability of the device 1 in order to determine if the device 1 may be suitably configured to resist such impact and continue operation. However, such portable devices 1 are typically not dropped in a direct vertical direction, but bobbled as the user is in motion. Thus, the device 1 will generally be dropped with some horizontal motion, as well as with some rotation about an axis of the device 1 as a result of being bobbled by the user. Thus, another aspect of the present invention comprises a durability test for the device 1 that includes rotating or tumbling drops in addition to purely vertical drops. The dynamic test method includes an apparatus for imparting a known rotational velocity and/or a known lateral or horizontal velocity to the device 1 at the moment the device 1 is dropped. The rotational velocity and/or the horizontal velocity imparted to the device 1 are known and recorded in order to gather data about the relative durability of the device 1 under different dynamic conditions, and to make any necessary durability improvements to the device 1. For example, the casing 10 may be selectively reinforced, impact-absorbing material may be added to the casing 10, or the material comprising the casing 10 may be altered. Each test includes, of course, a downward vertical velocity component as the device 1 accelerates due to the force of gravity, and the dynamic test method and apparatus is further capable of imparting both a rotational and a horizontal velocity component to the device 1. According to one embodiment, the test method and apparatus may be configured to drop the device 1 from a height of between about 1 foot and about 10 feet above the impact surface and the reaction of the device 1 may be measured with, for example, a sensor (not shown) disposed within the casing 10. The combination of velocity components used in the test method and apparatus of the present invention is thus configured to account for the variety of environmental conditions actually observed in the operating environment.

One ongoing concern with portable electronic devices is the size, weight, and capacity of the battery 400 used to power the device 1. Thus, according to one aspect of the present invention, one or more battery parameters are monitored and controlled by the device 1. More particularly, in one embodiment of the present invention, the recharging and testing functions of the battery pack 400 are directed by one or more software applications executed within and by the device 1. Monitoring and management of the battery pack 400 by the device 1 thereby reduces the need for an external battery recharging station that implements independent monitoring and status functions. The recharging, testing, and the power usage from the battery pack 400 may be controlled by the device 1, which serves to optimize the battery operational life and allows operational data to be collected from the battery pack 400 and the device 1 during operation. The software applications and/or associated hardware may also be configured to allocate battery power to the different functions and components of the device 1 according to, for example, the highest priority and/or necessity for maintaining operability of the device 1, wherein such a power allocation capability is generally not available when the battery control functions are associated with an external battery recharging station.

Figures 20A, 20B, 20C:
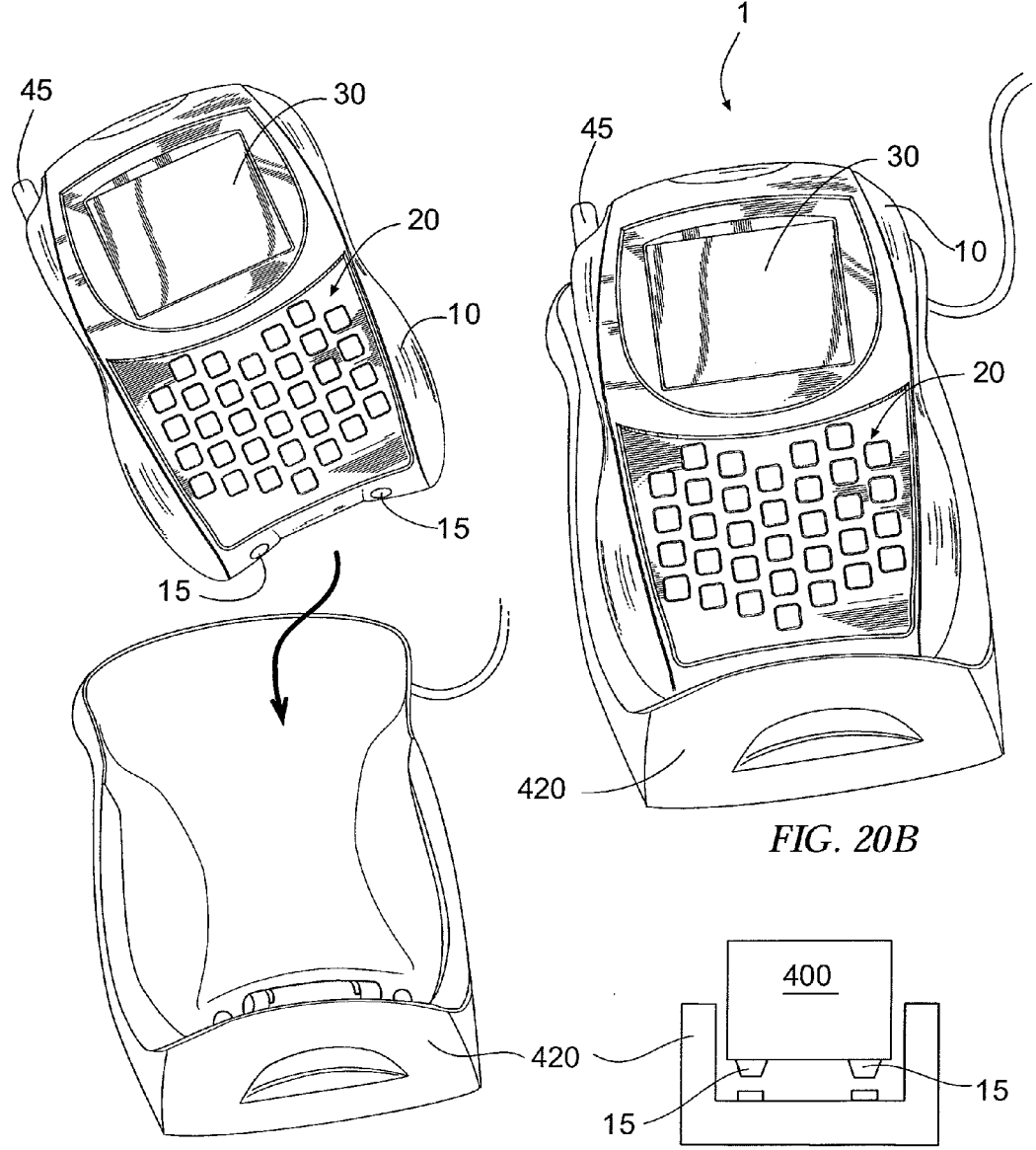
FIGS. 20A-20C illustrate various views of a portable data acquisition device and relation ship thereof to a battery recharging station according to one embodiment of the present invention.

According to this aspect of the present invention, the software and/or hardware for controlling and powering the device 1 include commands, function, or the like for monitoring the charge, condition, or other status of the battery pack, for controlling the allocation of battery power resources during operation of the device 1, and for directing and monitoring the recharging process for the battery pack 400. In one advantageous embodiment, the device 1 includes an application program interface (API) using the application software for controlling and monitoring the status of the battery pack 400, the allocation of power therefrom and the recharging process therefor. The status monitoring functions may include, for example, monitoring the charge level of the battery pack 400, the power usage for a particular task, the time required for a task, and the recharging status of the battery pack 400. In some instances, the monitoring function may also serve to indicate any abnormal power usage conditions, to determine and implement reduced-power usage mode parameters, and/or to indicate operational parameters associated with the battery pack 400. When the battery pack 400 is engaged with the associated external recharging station 420 through contacts 15 in the casing 10, as shown in FIGS. 20A-20C, the software/hardware for battery monitoring and/or the API provides the necessary instructional input to the recharging station 420 for recharging the battery 400 while monitoring the condition of the battery 400 during the recharging process. In some instances, however, the software/hardware for battery monitoring and/or the API may just be configured to determine whether to accept power from the recharging station 420 for recharging the battery 400. Accordingly, the device 1 is configured to start and stop the charging process so as to provide for optimum recharging conditions, and is also capable of identifying and alerting the user to any abnormalities in the charging process or with the battery pack 400 and/or device 1.

According to one embodiment of the present invention, the operational life or capacity of the rechargeable battery pack 400 is determined according to the duration of the typical work shift for the typical user of the portable electronic device 1. In the alternative, the capacity of the battery pack 400 may be more particularly determined and tailored to a particular work shift for a particular user, or may be determined on a task-specific basis such that a shift is determined according to a particular allocation of such tasks. Further, studies of the power usage patterns of similar portable electronic devices may provide designers with information about how the device 1 is likely to be used and the power consumption thereof during a typical work shift or in intervals where the user is away from the recharging station. Thus, one skilled in the art will appreciate that the battery capacity may be customized in many different manners. As a result, according to one embodiment of the present invention, the battery pack 400 used to power the device 1 may be sized to have a capacity for providing sufficient power for the device 1 for a typical work shift. The battery pack 400 may be optimized by altering, for example, the size, the weight, the type, the charging and/or discharging characteristics, and/or the storage capacity of the battery 400, as appropriate. As such, the device 1 is not burdened with significant extra weight or battery capacity that is not needed. The optimization of the battery life thereby helps to keep the weight of the device 1 to a minimum, while simultaneously providing sufficient power for the expected conditions of operation during the shift.

However, in some instances, since the characteristics of a battery 400 may change over time, the battery 400 may be configured to have a reserve charge capable of operating the device 1 in either a full power or reduced power mode for a particular amount of time until the battery pack 400 can be recharged. The battery 400 may be configured to indicate to the device 1 when the reserve charge is actuated or, for example, the software/hardware for monitoring the device 1 or the API may be configured to identify when the reserve charge is actuated. In either instance, the battery 400 and/or the device 1 may be configured to provide an alert to the user that the reserve charge is in effect. The reduced-power usage mode for the device 1 may comprise, for example, a "sleep" mode where only necessary functions of the device 1 remain operational, wherein the variety of configurations for such a sleep mode will be appreciated by one skilled in the art. In some instances, the reserve charge may provide a reserve power capacity of, for example, between about 5% and about 100% of the optimized battery capacity for the particular device 1. In either instance, regardless of whether a reserve capacity is provided with the battery 400, the conditions during a shift may be continuously or periodically monitored and the battery re-optimized, if necessary. Further, the monitored parameters of the battery pack 400 and/or the device 1, such as the condition of the battery pack 400, the power allocation to the device 1, and the recharging conditions, may also periodically be gather and used to provide a report.

In some instances, a battery system for a portable electronic device may have both a primary and secondary power source. As such, according to some embodiments of the present invention, the device 1 may have a battery pack 400 configured so that the primary power source therein serves as both the primary and secondary power sources. For example, the battery pack 400 may be divided into two separate cells, wherein one cell functions as the primary power source, while the other cell functions as the secondary power source. Accordingly, if the primary cell dies or otherwise becomes depleted to the point that it is not able to provide usable power, the secondary cell will have sufficient power to at least preserve the data stored on the device 1. Such a switch between the primary and secondary cells may occur automatically from the configuration of the battery 400 or may be controlled, for example, by the software/hardware for battery monitoring and/or the API.

Figure 23:
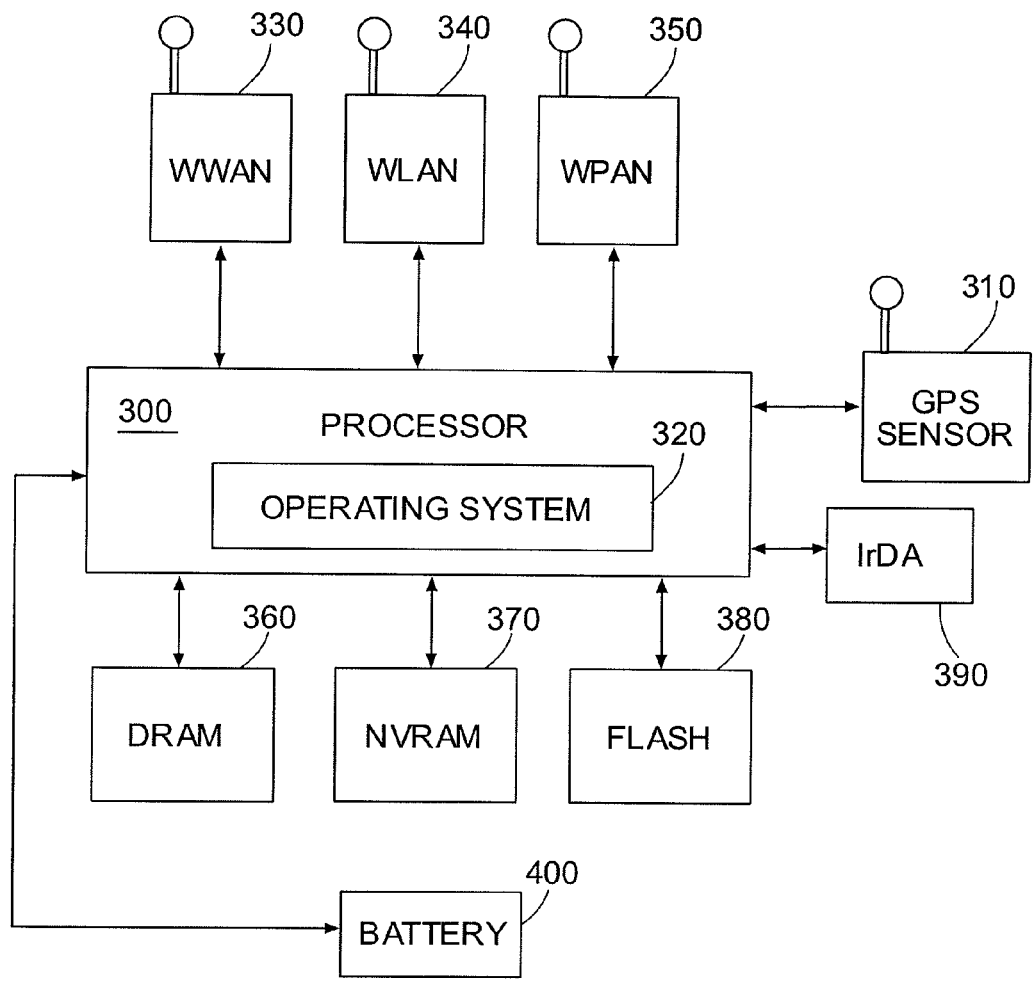
FIG. 23 illustrates a system schematic of a data acquisition device according to one embodiment of the present invention.

Since the device 1 may, in some instances, be used to store certain data, and since the reliability of the battery power of such portable devices is often uncertain, embodiments of the present invention also address the data storage characteristics of the device 1. Thus, according to one advantageous embodiment of the present invention, the device 1 implements a Windows™ CE operating system and includes three types of memory modules, namely a Dynamic Random Access Memory (DRAM) 360, a programmable permanent memory known as a Flash Memory 380, and a Non-Volatile Random Access Memory (NVRAM) 370, as shown in FIG. 23. Moreover, the device 1 is capable of using all three types of memory modules, either separately or in combination, to facilitate, as necessary, the variety of complex tasks described herein.

Software applications are typically loaded, executed, and/or run by the device 1 in the DRAM 360, wherein the DRAM 360 also receives data input by the user and directs the display of the application output or results. The data contained in the DRAM 360 must be refreshed frequently or the contents will be lost. Further, the DRAM 360 comprises a volatile storage mechanism, which means the data will be lost if electrical power to the DRAM 360 is lost. The Flash Memory 380, on the other hand, is non-volatile, programmable, and provides for permanent data storage unless the data is erased. Data stored in the Flash Memory 380 is retained even if electrical power to the Flash Memory 380 is lost. Flash Memory 380 may also be built into the device 1 or provided as a removable memory card, which may be engaged with/disengaged from the device 1 as necessary. Typically, data entered into the DRAM 360 may be selectively transferred to the Flash Memory 380 for permanent storage. However, the process of writing the data to the Flash Memory 380 is sometimes time-consuming and, in the field, could easily interfere with the rapid entry of data that is often required under typical operating conditions for the device 1. Thus, if power were to be lost before the necessary data could be written to the Flash Memory 380 from the DRAM 360, such data would also be lost.

Accordingly, advantageous embodiments of the present invention provide an additional NVRAM memory module 370 for supplementing the DRAM 360 and Flash Memory 380 modules. The NVRAM module 370 provides the device 1 and the user with a memory that is both permanent (non-volatile) and configured for high-speed access. Thus, in one embodiment of the present invention, the NVRAM module 370 acts as an intermediate memory between the volatile DRAM 360 and the permanent Flash Memory 380. Data stored in the NVRAM 370 can be recovered even after a total loss of electrical power or a total failure of the operating system while data is being input. Data may be written simultaneously to the NVRAM 370 and the DRAM 360, or sequentially from the DRAM 360 to the NVRAM 370. In either instance, the NVRAM 370, in use, generally retains all of the input data until the software application/API can purposefully write the data into the Flash Memory 380 for permanent storage. In some instances, the device 1 may provide the user with the opportunity to select the memory module to which entered data will be directed. In still other instances, the data may only be written from the NVRAM 370 to the Flash Memory module 380 so as to expedite the data storage process and to reduce redundancy in the saving the necessary data, though both the DRAM 360 and the NVRAM 370 may sometimes be configured such that both memory modules are capable of writing the data to the Flash Memory module 380. Thus, the NVRAM 370 provides a permanent storage site for data that is usually only stored temporarily in the DRAM 360, where it is vulnerable to being lost until it is saved to the Flash Memory 380. Without the presence of the NVRAM 370, all unsaved data would be lost if the device 1 experienced a loss of power or a total failure of the operating system 320. Since in the present invention the NVRAM 370 stores each data entry permanently, substantially upon being entered in to the device 1, a loss of power will not cause an irretrievable loss of data. In one embodiment, the NVRAM 370 comprises, for example, an SRAM having a separate battery back-up system.

Figure 22:
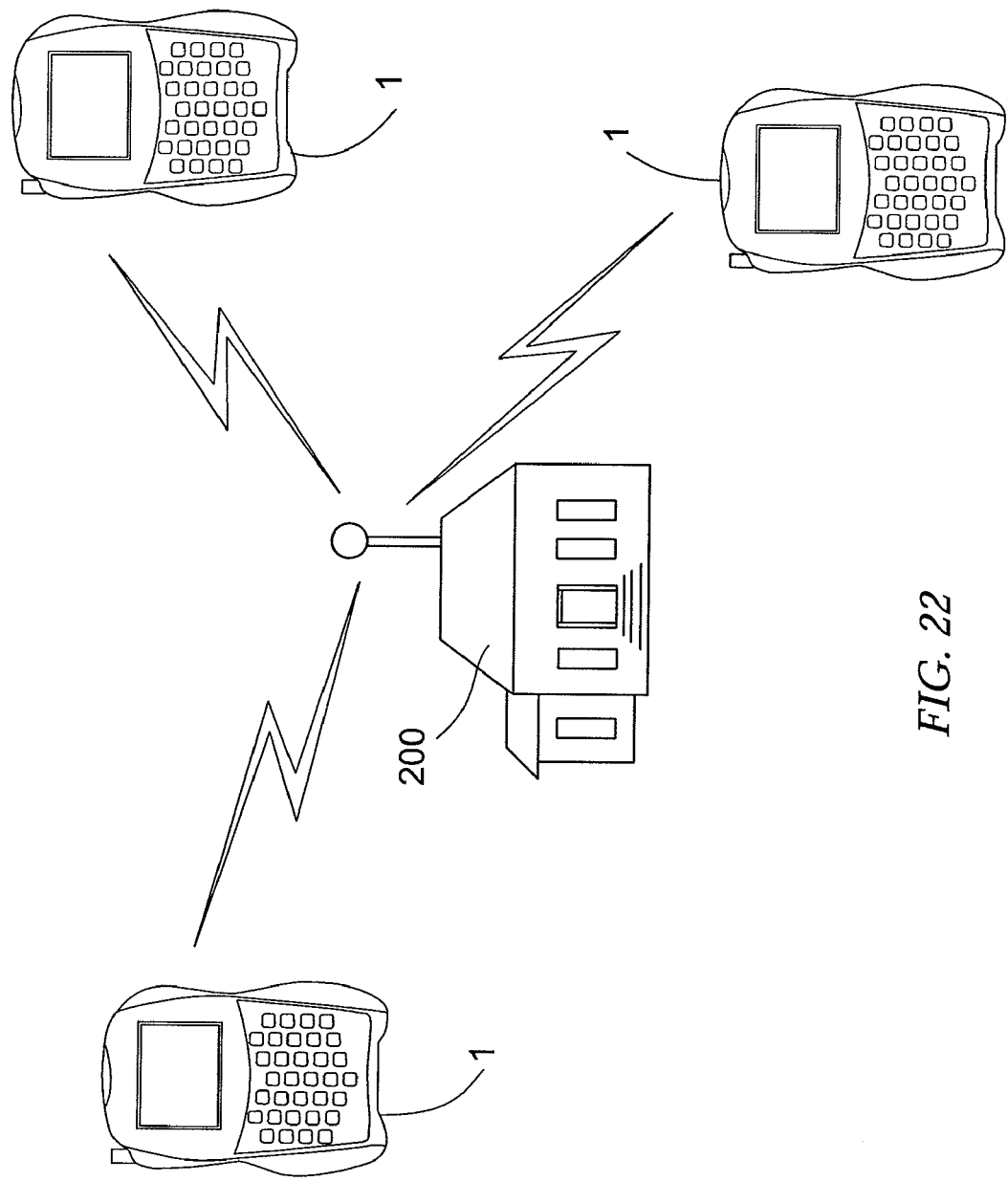
FIG. 22 illustrates a relationship between a portable data acquisition device and a central host system according to one embodiment of the present invention.

According to certain advantageous aspects of the present invention, the device 1 is configured to receive, manipulate, and output data related to package tracking. The device 1 is thus configured with one or more data input components comprising, for example, a keypad 20, a touch screen, a graphic digitizer, a scanner 55, an audio capturing device, a video capturing device, a stylus, a Global Positioning System (GPS) sensor 310, a real-time clock, a switch 40, and/or combinations thereof. The device 1 is also configured with one or more data output components comprising, for example, a display 30, a speaker, an indicator, an acoustic modem/dialer, a hard copy printing device, and/or combinations thereof. In some instances, the device 1 may be configured with a data input/output component such as, for example, an Infrared Data Association (IrDA) communication port 390 or a cellular telephone, wherein the telephone may be operably engaged with the device 1 or have the necessary componentry built into the device 1 itself A processor 300 and an operating system 320 such as, for example, a Windows™ CE operating system, are also generally provided for performing manipulation of the data. The device 1 may also include, for example, a diagnostic software and/or hardware system, an application software loader, a systems software loader, and at least one application program interface (API). Embodiments of the device 1 also include a Dynamic Random Access Memory (DRAM) 360, a programmable permanent memory known as a Flash Memory 380, and a Non-Volatile Random Access Memory (NVRAM) 370, as previously described, for saving the data. Once the data is input, manipulated, saved, and prepared for output, particularly advantageous embodiments of the present invention may provide at least one of a Wireless Wide Area Network (WWAN) data radio 330, a Wireless Local Area Network (WLAN) data radio 340, and a Wireless Personal Area Network (WPAN) data radio 350 for communicating the data with a discrete and remote central data repository or central server 200, as shown in FIGS. 22 and 23.

According to one advantageous embodiment of the present invention, the wireless wide area network (WWAN) data radio 330 is one of several options available in the portable data acquisition device 1 for communicating with the central data repository or host system, or other systems. The WWAN data radio 330 is capable of providing real-time communication between the portable data acquisition device 1 and the host system 200. For example, the WWAN data radio 330 may allow the driver to stay in communication with the host system 200 during the delivery route. Accordingly, during the route, the driver may be notified, in substantially real time, of a change to the route or the route along which the driver is directed may be otherwise dynamically changed during the day. For instance, if Driver A breaks down, a message could be sent via the WWAN data radio 330 to Driver B to direct Driver B go to the breakdown location of Driver A and pick up guaranteed delivery packages, and to continue on Driver A's original route. Alternatively, a message could be sent via the WWAN data radio 330 to a driver at any time to inform the driver of a new next day air package pick up, in response to which the driver could then change or add to the route to pick up the package.

Accordingly, the user does not need a separate transceiver (e.g., a DVA or an acoustic modem/dialer) or a telephone line to communicate with the host system 200. However, in some instances, the separate transceiver may be provided with the device 1, for example, for redundancy, as a back-up communication device, or as a primary communication device in instances where wireless communication may not be available. When the device 1 is provided with the WWAN data radio 330, package tracking data may be uploaded to the host system 200 in real-time or near real-time as that data is entered into the portable data acquisition device 1. Voice/data network protocols and frequencies that may be supported include, but are not limited to, for example, the global system for mobile communications (GSM)/general packet radio service (GPRS), dual-mode advanced mobile phone service (AMPS)/circuit switched data and code division multiple access (CDMA/1XRTT), DataTAC, and Mobitex. Other network protocols and frequencies are known in the art and can be supported as well. In one embodiment, the GPRS or CDMA wireless wide area network interface allows communication between the portable data acquisition device 1 and public digital cellular telephone networks. As such, in one embodiment, the device 1 may be configured as or may include a cellular telephone capable of allowing the user to communicate over the public digital cellular telephone networks.

A wireless local area network (WLAN) data radio 340 is another one of the several options available in the device 1 for communicating with the host system 200 or other systems. In one advantageous embodiment, the WLAN data radio 340 provides communication between the portable data acquisition device 1 and in-building or other local area systems when the device 1 is within a confined geographic area such as a carrier or hub facility, a building, a compound, and/or and area within a limited boundary. Data acquisition devices known in the art sometimes rely on separate base station devices with which the device must be engaged in order to download route information and upload end-of-the-day package tracking information and statistics. In one advantageous embodiment, the WLAN data radio 340 obviates base station functions and allows direct communication between the data acquisition device 1 and the host system 200 or a local system, through which to upload data and/or to direct applications, software updates, or other data to the device 1. In another embodiment, the WLAN data radio 340 allows for direct communication between the device 1 and other wireless devices within the local area system so as to facilitate transfer of data between the local area system and the data acquisition device 1 when host access is not necessary or is unavailable. In some instances, however, the local area system may also be configured to independently communicate with the host system 200. In still another advantageous embodiment, communication between the WLAN data radio 340 and the local area system may be initiated by a transmitter/receiver arrangement. For example, the local area system may include a transmitter device, while the device 1 would include a corresponding receiver device. The receiver device may be configured so as to receive an actuation signal from the transmitter device when the device 1 is within a certain proximity to the local area system, wherein the actuation signal may be configured to initiate the communication of package tracking data between the device 1 and the local area system and/or the host system 200. One skilled in the art will also appreciate that the receiver and transmitter device could also be switched between components such that the local area system would be provided with the actuation signal upon the device 1 being within a sufficient range thereof.

A wireless personal area network (WPAN) data radio 350 is still another one of the several options available to the portable data acquisition device 1 for communicating with the host system 200 or other peripheral devices or systems. In one advantageous embodiment of the present invention, the WPAN data radio 350 provides connectivity between the portable data acquisition device 1 and peripheral devices typically used in the carrier industry such as, for example, personal computer systems such as a carrier computer system and a consignee computer system, printers, lock boxes, admonishment devices, and door locks, or combinations thereof using, for example, a protocol such as a Bluetooth protocol. In another advantageous embodiment, the WPAN data radio 350 may also be configured to communicate with a cellular telephone. Thus, if a user operates a portable data acquisition device 1 in an area that does not support one of the WWAN data radio protocols, the user can transmit package tracking data from the portable data acquisition device 1 to a cellular phone via the WPAN data radio 350 and thereby forward the data to the host system 200 via the cellular network. Alternatively, the data can be transmitted from the WPAN data radio 350 to a vehicle-mounted satellite transceiver and forwarded thereby to the host system through, for example, a wide area satellite network. In still another advantageous embodiment, as with the WLAN data radio 340, communication between the WPAN data radio 350 and the peripheral devices may be initiated by a transmitter/receiver arrangement. For example, a peripheral device may include a transmitter device, while the device 1 would include a corresponding receiver device. The receiver device may be configured so as to receive an actuation signal from the transmitter device when the device 1 is within a certain proximity to the peripheral device, wherein the actuation signal may be configured to initiate the communication of package tracking data between the device 1 and the host system 200 and/or the communication of other data between the device 1 and the peripheral device. One skilled in the art will also appreciate that the receiver and transmitter device could also be switched between components such that the peripheral device would be provided with the actuation signal upon the device 1 being within a sufficient proximity thereto.

As such, the device 1 may include at least one of the WWAN data radio 330, the WLAN data radio 340, and the WPAN data radio 350, wherein the data radio(s) may be integral with the device 1 or configured as a transceiver unit capable of being operably engaged with the device 1. According to one embodiment of the present invention, where the device 1 includes more than one of the data radios, a software application may choose the data radio most suited for the task at hand or the appropriate data radio may be manually chosen by, for example, the user or through a communication from the host system. In instances where the three types of data radios are available (the WWAN data radio 330, the WLAN data radio 340, and the WPAN data radio 350), the software application is preferably configured, using a matching criteria, to choose the appropriate data radio for accomplishing a particular task, however, the data radio may also be chosen by the user from the user's identification of the task, by a sensor engaged with the device 1 for evaluating the available manners of communication or the available signals therefor, or by the host system 200. For example, the software application would choose the WPAN data radio 350 to interact with a customer's database, as described further herein, or the WLAN data radio 340 to interact with systems at the carrier's hub, instead of using the other data radios. As previously described, the actuation of a particular data radio may be accomplished manually, via the software system or API of the device 1, or through the use of an actuation receiver/transmitter system, depending upon the task being accomplished. These options for actuating a particular data radio device are directed by, for example, the software application that includes automatic choosing algorithms, external transmitter actuation, and user actuation functions, among other options, to actuate the data radio most suited for the particular task at hand. As the appropriate data radio is actuated, the details of the particular task may also be stored by the device 1 in a database therein. Subsequently, either in real time or on a periodic basis, the database entries may be transmitted to the host system via one of the data radios.

In some particularly advantageous embodiments, the portable data acquisition device 1 may also include a GPS sensor 310, as shown in FIG. 23, that is configured to acquire, for example, a latitude, longitude, altitude, course, speed, universal time (UTC), and date, wherein such data may be acquired in National Electrical Manufacturers Association (NEMA) data format or other appropriate data format. As will be appreciated by one skilled in the art, the GPS sensor 310 acquires data, sometimes known as ephemeris data, identifying the number of satellites in view and the relative positions of those satellites. In addition, data regarding, for example, heading and ETA can also be captured, which enhances the determination of the position of the GPS sensor 310 and allows an area to be profiled or segmented based on the common characteristics of the data.

Many uses for a GPS sensor 310 in combination with the device 1 will be readily appreciated by one of ordinary skill in the art. For example, the GPS sensor 310 may assist a delivery person in delivering a package to a specified or desired location. In such an instance, GPS data such as, for example, a latitude, a longitude, and/or and altitude, of the desired location can be loaded onto the device 1, in some instances as NEMA formatted data. The GPS data may be loaded onto the device 1 at the direction of the host system 200 or in response to an identifier for the package scanned into the device 1 where, for example, the identifier may comprise a code from the package label scanned in by the scanner 55. When the GPS data is loaded, the device 1 is at an immediate location. The GPS sensor 310 engaged with the device 1 can determine GPS data corresponding to the immediate location and then, via the GPS data, may then be configured to direct the delivery person from the immediate location to the desired location, in some instances by determining a route therebetween, such that the package can be delivered to the addressee. That is, the package can be delivered when the immediate location of the device 1 substantially corresponds to the desired location as determined from the GPS data for each location. Various data may also be gathered along the route such as, for example, the elapsed time between points on a route or the elapsed time for the entire route. However, if the desired location is reached by the delivery person and the package delivered, but the GPS data of the immediate and desired locations do not correspond, the device 1 may be configured so as to allow the GPS data for the desired location to be modified or updated to the GPS data of the immediate location, wherein the altered data may also be transmitted to the host system for universally updating the data for that desired location.

In a similar manner, a GPS sensor 310 associated with the device 1 can identify inaccuracies or prevent mis-delivery of packages in a package delivery system. At present, delivery drivers rely on the destination addresses of packages in the delivery process. The destination address of every package on the delivery route is downloaded to the DIAD that the driver uses for his or her deliveries. A problem arises, however, when a delivery driver mistakenly delivers a package to a wrong address. While current DIAD systems provide the driver with the correct destination address for a package, these systems are not capable of confirming that the package was actually delivered to the correct address. In contrast, the GPS sensor 310 of the portable data acquisition device 1 can indicate to a delivery driver that he or she is about to deliver a package to an improper address. In operation, the delivery information that is downloaded to the portable data acquisition device 1 includes GPS data having the latitude, longitude and/or altitude for each package destination address. The GPS sensor 310 engaged with the device 1 can determine GPS data corresponding to the immediate location of the device 1 and then, via the GPS data, can direct the delivery person from the immediate location to the destination address, in some instances by determining a route therebetween. Various data may also be gathered along the route such as, for example, the elapsed time between points on a route, the elapsed time for the entire route, or a particular time that the device 1 is at a specific location along the route. Therefore, when a delivery driver indicates to the device 1 that the package is about to be delivered to the destination address, the portable delivery acquisition device 1 performs a check of the immediate GPS position and compares the immediate GPS position to the GPS position associated with the package destination address. If the immediate GPS position does not match the package destination GPS position, the portable delivery acquisition device 1 notifies or alerts the delivery driver of a possible mis-delivery. In one embodiment, a possible mis-delivery notification occurs if the current GPS position of the driver is outside predetermined GPS data tolerance limits with respect to the package destination GPS position. In one embodiment, the tolerance limits are based on the size of the service point created by linking delivery address information to the corresponding geographic information from the GPS data. Thus, in one embodiment, the tolerance limits used are specific to the type of territory served. However, if a mis-delivery notification is triggered, indicating that the GPS data of the immediate location and destination address do not correspond within the tolerance limits, the delivery person firsts perform a check to verify the destination address. If the delivery person confirms that the destination address is correct, the device 1 may be configured so as to allow the GPS data for the destination address to be modified or updated to the GPS data of the immediate location, wherein the altered data may also be transmitted to the host system for universally updating the data for that destination address.

In addition to determining the position of an immediate location, the GPS sensor 310 associated with the portable data acquisition device 1 allows a delivery route to be determined or accurately mapped. For example, it may often be the case in rural areas that a package destination address is not accurately depicted on a map. Such inaccuracies often hinder dispatch planners in their efforts to create an efficient package dispatch plan or delivery route. The device 1 having the GPS sensor 310 minimizes or substantially eliminates this problem by providing an accurate longitude, latitude, and/or altitude for each package delivery location or destination address. In one embodiment, pick-up and delivery data is checked and the central database is continually updated with accurate latitude, longitude, and altitude for a location, whenever a package is delivered or picked up. In another embodiment, the database formed by the portable data acquisition device 1 provides information on various destination addresses as well as the traces thereto, wherein a trace is the street path or network traveled to the destination during the delivery route. This trace information contributes additional accuracy to traditional street mapping in a manner that is also useful outside of parcel pickup and delivery such as, for example, in directing emergency response personnel, since such data is collected in a manner that may be useful in practically all GIS (geographic information systems). The trace data is continually validated and updated as a byproduct of the GPS functionality in the portable data acquisition device 1. As a result, updated and accurate geographic and traffic information is provided as a product of a package delivery service. As standardized addresses are added to the trace information, routing will become more accurate than calculations based on street path alone. For example, travel distances along driveways and private roads can thus be identified separately from street path travel to further characterize or profile a given geographic territory.

There may be some instances when the destination address may not entirely correspond to the actual address to which the package is delivered. That is, packages are often mis-addressed, but often the mistakes made in addressing packages occur with sufficient regularity that a carrier can recognize the error and deliver the mis-addressed package to the correct destination address. For example, a package intended for the corporate office of UPS, Inc., might be incorrectly addressed to "The Brown Uniform Guys". In such instances, embodiments of the present invention implement a package destination address alias database, which may be resident on the host system and/or stored partially or in total on the device 1. Some carriers may have created alias databases for these regularly used, but inaccurate destination addresses. However, the GPS sensor 310, in accordance with embodiments of the present invention, facilitates automation of the collection and creation of these destination address aliases by, for example, flagging an incorrect address as an alias and updating the alias database with an associated GPS position information after a single successful delivery of a mis-addressed package. That is, the delivery person may, in some instances, determine the actual address to which the package is being delivered and may enter this actual address into the device 1 or otherwise compare the actual address to the destination address originally loaded to the device 1. If the actual and destination addresses do not correspond, the respective addresses may be entered into the alias database as aliases of each other, wherein such aliases may also be supplemented with the GPS data for the actual location.

In still other instances, the destination address and aliases thereof may be supplemented with additional data such as, for example, census data, zip code+4 data, revenue data, injury data, accident data, theft data, damage data, maintenance data, special request data, preference data, maintenance data, and combinations thereof, which may facilitate positive identification of the destination address by the driver and may also serve to apprise the driver of any special conditions associated with the destination address. The ability to link delivery route information with the position information captured by the GPS sensor 310 thus allows for the creation of a data standard that is an improvement over census and zip code+4 data alone. The benefits of this are far greater than just preventing mis-deliveries. While one use of such data is to enhance the accuracy of customer data in the package delivery industry, this data has value outside the parcel delivery and pickup industry that will be readily apparent to one of ordinary skill in the art such as, for example, to direct emergency response personnel to a particular destination or location.

According to some embodiments of the present invention, some of the applications of the portable data acquisition device 1, for example, may be described in the context of a package delivery. When a driver delivers a package to a consignee, the driver uses the GPS sensor 310 to obtain the GPS position information of the consignee's actual physical location. The driver uses the scanner 55 of the portable data acquisition device 1 to capture the package tracking data from the package or packages to be delivered and retrieves the corresponding destination address from the delivery information that was previously downloaded to the portable data acquisition device 1 from the central host system 200 via the WLAN and/or WWAN data radios 340, 330. The consignee GPS location information is then automatically compared against the geocode (latitude/longitude) of the destination address that had been gathered as part of the delivery information and stored in the host system, and the driver is notified of a possible mis-delivery if the two positions are too far apart. Assuming a successful delivery, the database on the host system may be either manually or automatically updated, over a network and using the WLAN data radio 340 or WWAN data radio 330, with the time and/or physical location of the delivery. In this manner, real-time package tracking information is expeditiously made available for dissemination on request. Further, a manifest of the package or packages delivered by the delivery person may, in some instances, be downloaded directly to the consignee's personal computer and/or network via the WPAN data radio 350, or the Infrared Data Association (IrDA) communication port, or provided in a periodic report to the consignee.

Further, there may be instances, when a driver is collecting packages from a shipper, where manifest information or other delivery information may be downloaded directly from the shipper's computer system, with the appropriate authorization and/or appropriate security precautions and considerations, to the portable data acquisition device 1 via the WPAN data radio 350 and/or the IrDA communication port 390. If the shipper's location or other information has not already been obtained, the GPS sensor 310 may be directed to capture the latitude, longitude and/or altitude of the shipper's location and then the GPS data and the manifest information or other information may be transmitted to a database on the host system using the WLAN data radio 340 or the WWAN data radio 330. According to one embodiment of the present invention, the WPAN data radio 350 and/or the IrDA communication port 390 may be used to obtain data from a shipper's computer without using a cable and without unduly interfering with or invading the shipper's databases or other files. The WPAN data radio 350 and/or the IrDA communication port 390 and/or the software or API therefore may be configured to interact with the shipper's computer and databases in a manner that limits the interaction to the needed information in the database. That is, the extent to which the WPAN data radio 350 and/or the IrDA communication port 390 interacts with the shipper's computer and databases is restricted, either by the operational parameters of the WPAN data radio 350 and/ or the IrDA communication port 390 or by the parameters of the appropriate communication portion the shipper's computer, only to the necessary data, thus preventing any excessive interference with or invasion into the shipper's private files or databases. In an era of growing privacy concerns, the use of the WPAN data radio 350 and/or the IrDA communication port 390 to obtain such a limited set of data prevents the inadvertent exposure or transmission of private customer data, since only the needed shipping data is accessed and transferred to the device 1, when and if necessary. In some situations, the information and/or files accessed by the WPAN data radio 350 and/or the IrDA communication port 390 in the shipper's computer may be tracked and the information gathered and prepared into a report, which may be periodically provided to the shipper.

In some instances, if a driver is working in an area where the GPS sensor 310 cannot operate, one or more of the wireless communication devices associated with the portable data acquisition device 1 may be used to determine or validate the driver's location. More particularly, each WLAN data radio 340 and/or WPAN data radio 350 typically has a unique electronic address. As such, a driver's location may be validated by confirming that one or more of the wireless data radios in the portable data acquisition device 1 is within a predetermined range of a particular wireless device previously accessed by the device 1 and associated with a consignee or shipper.

According to yet another advantageous aspect of the present invention, the device 1 may also be configured to verify that the person receiving the package at the destination address is the consignee or an authorized representative thereof. In order to do so, other data may be linked with the information associated with the destination address. Such other data may comprise, for example, a list of authorized personnel, as well as pictures, signatures, and/or fingerprints thereof, depending on the level of security requested by the consignee. As such, when the package is transported to the destination address, a person accepting the package may be required to sign a signature capture window with the stylus 45, provide a fingerprint which may be read, for example, through a digitizer function implemented in the display 30, or have a picture taken by, for instance, a digital camera implemented in the device 1. At the same time, photographs and/or corresponding signatures of authorized personnel may be shown on the display for the delivery person's comparison. Thus, not only can the signature, fingerprint, and/or picture be verified against the database records, but the signature may also be verified as corresponding to the person in the picture and/or the provided fingerprint. In some instances, the device 1 and/or the host system may include automated identification systems for matching and verifying the data provided by the person receiving the package to the authorization information contained in the database. In still other instances, the data collected from the person accepting the package may also be transmitted to the host system and provided upon request, for example, if the consignee wishes to verify the identity of the person receiving the package, or periodically as a report to the consignee.

In still another embodiment of the present invention, a portable data acquisition device 1 incorporating a GPS sensor 310 may be configured to communicate with one or more data sensors on, for example, a delivery vehicle, a building, or about the carrier hub. Accordingly, a system for automating the collection of data for time study and work measurement statistics is provided. More particularly, carriers go to great expense to gather data on package delivery tasks in an effort to make the delivery process more efficient. At present, the process of data gathering is typically performed manually and involves a person with a stopwatch and a clipboard physically traveling alongside delivery drivers, taking meticulous notes of the driver's actions for each stop in the delivery route. In one embodiment of the present invention, the GPS sensor 310 in the portable data acquisition device 1 automates the process, wherein the GPS sensor 310 provides GPS location information for the delivery driver on any given date and at any given time in the delivery route. As previously discussed, the gathered data for time study and work measurement statistics may be transmitted at any time to the host system 200 via one of the data radios 330, 340, 350.

In some instances, sensors may be installed on or about the delivery vehicle, such as on the engine, doors, and other electrical components of the vehicle so as to allow the portable data acquisition device 1 to gather additional package delivery details. In a preferred embodiment, the sensors communicate with the device 1 and provide data such as, for example, when during the route the vehicle was stopped and started, travel information such as speed and heading, the amount of time the driver was away from the vehicle, and other information such as whether or when the doors of the vehicle were opened and closed. This sensor information, coupled with the GPS location information, allows the carrier to accurately gather data about a driver's movement and actions during all of the tasks performed on a delivery route. In addition, for example, a delivery vehicle door sensor in combination with a GPS sensor 310 can also prevent the theft of packages by notifying the delivery driver or the carrier whenever the driver leaves the delivery vehicle area and the vehicle door is ajar or unlocked. In some instances, the vehicle may be equipped with a control system (not shown) to receive and respond to a remote electronic instruction from the device 1 or the host system so as to, for example, close and lock the doors, or the controller may be configured to determine and provide a response to the carrier in response to a query about the status of the vehicle. In other instances, additional sensors may also be, for example, disposed on or about certain buildings or premises or about the carrier's hub, so as to provide further data for time study and work measurement statistics.

Since the portable electronic device 1 generally operates on battery power and may be prone to damage from being accidentally dropped, one particularly advantageous embodiment of the present invention comprises a data extraction tool (not shown), operating on a separate computing device, for selectively locating and extracting data from the memory of the device 1 in the event of power loss, operating system failure, or other problems that may prevent the data stored within the device 1 from being accessed. Thus, the data extraction tool, which may have portions included in the device 1, is intended to be functional when the operating system 320 and/or processor 300 of the device 1 is not operating or, in some instances, when the device 1 has no power. More particularly, the data extraction tool according to embodiments of the present invention is capable of locating data stored within the Flash Memory 380 or in the NVRAM 370 without using the electronic address of that data originally assigned by the operating system 320. In one embodiment, the data extraction tool is configured to use either the WLAN data radio 340 or the Infrared Data Association (IrDA) communication port 390 through which to access, retrieve, and transfer the data, as shown in FIG. 23. In one particular embodiment, the user may choose either the WLAN data radio 340 or IrDA communication port 390 through which to access the data when using the data extraction tool. In another aspect, the data extraction tool includes an application program interface (API), operating on a separate computing device, configured to automatically select either the WLAN data radio 340 or IrDA communication port 390 through which to access the data and to control and monitor access to the memory modules using the application software.

More particularly, for example, in the event of an operating system crash, the extraction application may be used to recover the data stored in the memory of the disabled device 1. The extraction application typically resides on a separate and discrete computer or other processing device and may be configured to communicate with the disabled device 1 via the IrDA communication port 390. In one embodiment, the extraction application operates on a second functioning device 1. Alternatively, the extraction application may run on a laptop computer or other portable computing device since, in some instances, contact with the IrDA communication port 390 may be more readily maintained during the data recovery process. As a first step in the extraction process, the extraction application communicates with the motherboard of the disabled device 1 to receive confirmation from the motherboard that the unit is in a failed or monitor state. Once the failure is confirmed, the extraction application sends a series of commands to communicate with the motherboard of the failed device 1. The syntax of the commands is particular to the motherboard used in the device 1, not unlike, for example, the BIOS of a personal computer motherboard. Using these commands, the extraction application instructs the motherboard to retrieve and transmit data from the memory of the disabled device 1 to the device on which the extraction application is being run or to a separate designated device. The retrieval commands may vary depending on the situation. For example, a user may retrieve all of the data between two memory addresses, or may retrieve certain amount of memory that follows a starting memory address. In still another example, the extraction application may be configured to capture all of the data stored in the memory of the disabled device 1. Typically, the data retrieved from the disabled device 1 is stored in the memory of the computer or other processing device running the extraction application. In some instances, if the extraction application is operating on a separate second functioning device 1, then the data becomes available to the user just as if the data had originally been collected and stored on the functioning device 1. Alternatively, the extraction application may allow a user to access, print, view, transfer or otherwise manipulate the recovered data as needed.

In one embodiment of the present invention, the portable data acquisition device 1 includes the casing 10, as well as a WWAN data radio 330, a WLAN data radio 340, and a WPAN data radio 350. Further, the device includes any or all of a processor 300, a real-time clock, a Flash memory module 380, a DRAM memory module 360, a NVRAM memory module 370, a keypad 20, a display 30, a touch screen, a graphic digitizer, a scanner 55, an audio capturing device, a video capturing device, a receiver, a transmitter, a sensor, a switch 40, a speaker, an indicator, a microphone, an alert device, an acoustic modem and dialer, a cellular telephone, a hard copy printing device, a stylus 45, a battery charging indicator, a battery 400, a battery interface, a battery charger 420, a battery tester, a battery charging indicator, a battery level indicator, a power management processor, an Infrared Data Association (IrDA) communication port 390, a global positioning system (GPS) sensor 310, a Windows™ CE operating system 320, a diagnostic system, an application software loader, a systems software loader, a database, a database manager, and at least one application program interface (API) to control and monitor the various components of the device 1, operably engaged with the casing 10 and configured to provide any or all of the functionality of such a device 1 as described herein.

Figure 10:
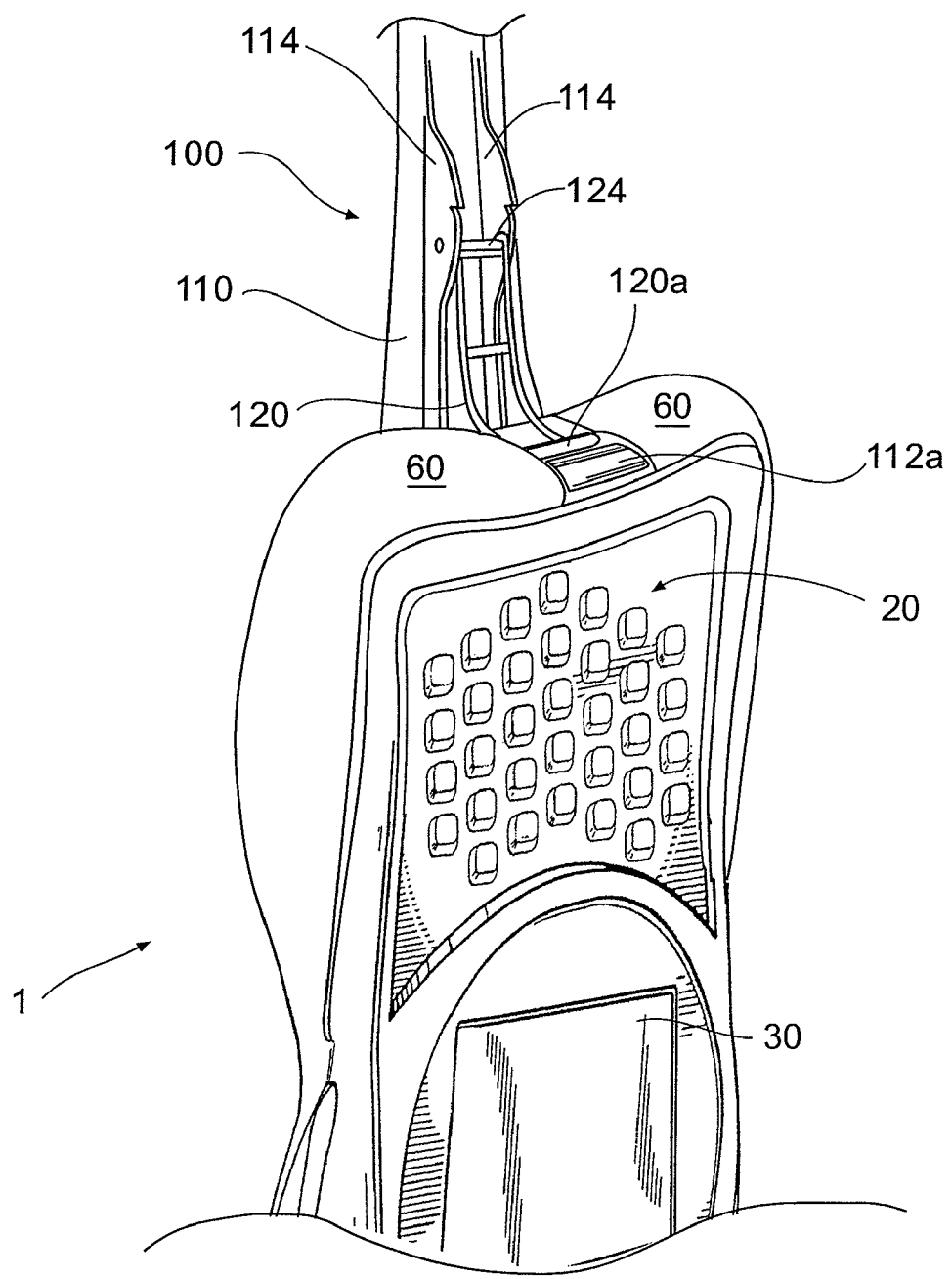
FIGS. 10-12 illustrate various views of a portable data acquisition device and relationship thereof to a device holder according to one embodiment of the present invention.
Figure 11:
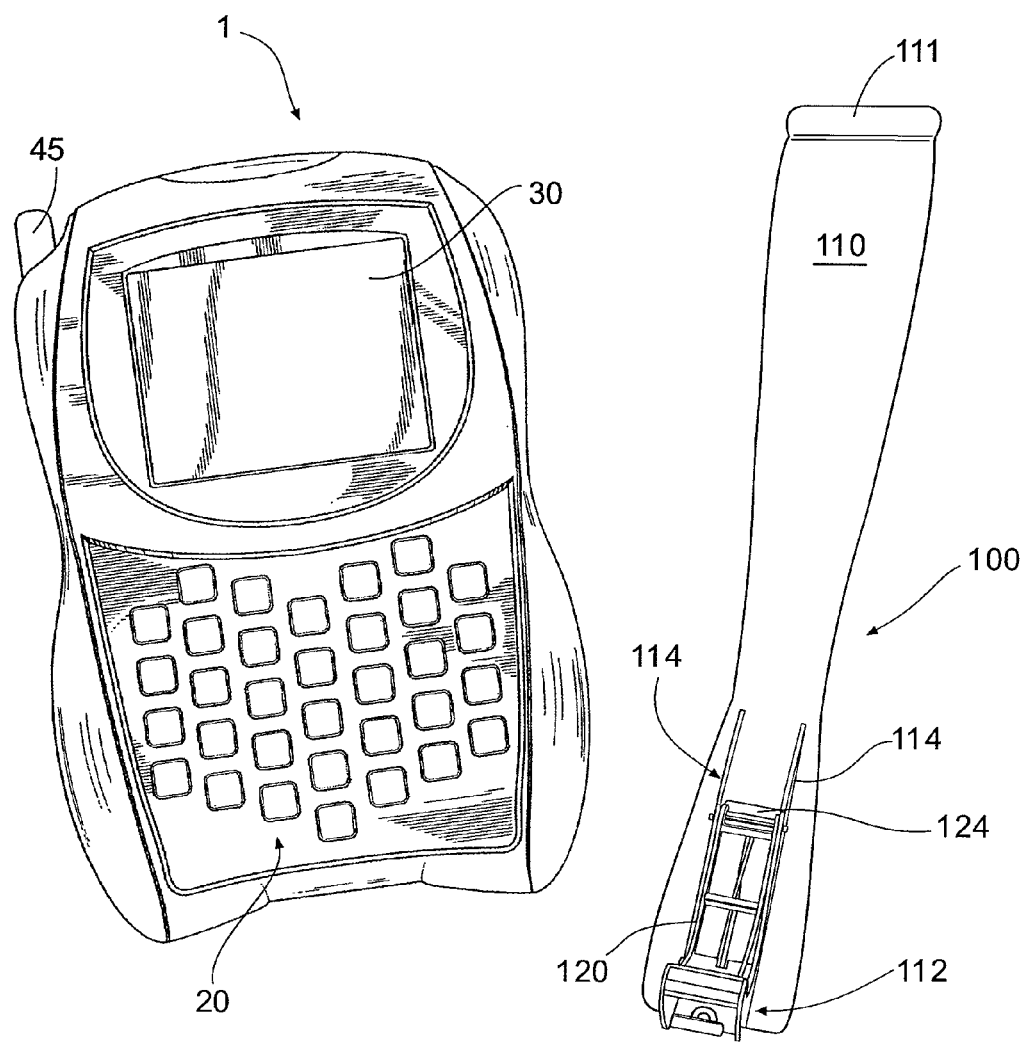
Figure 12:
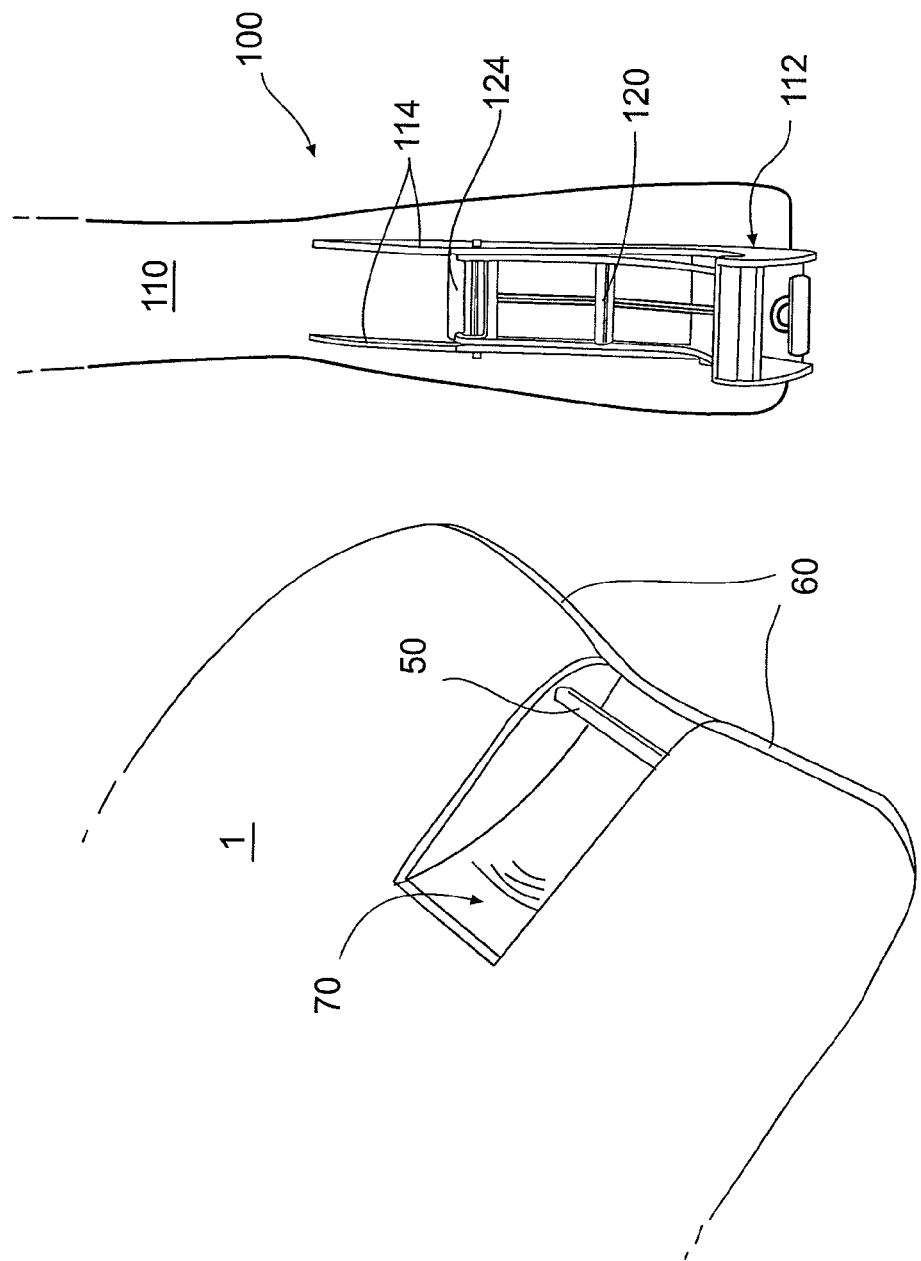
Figure 14:
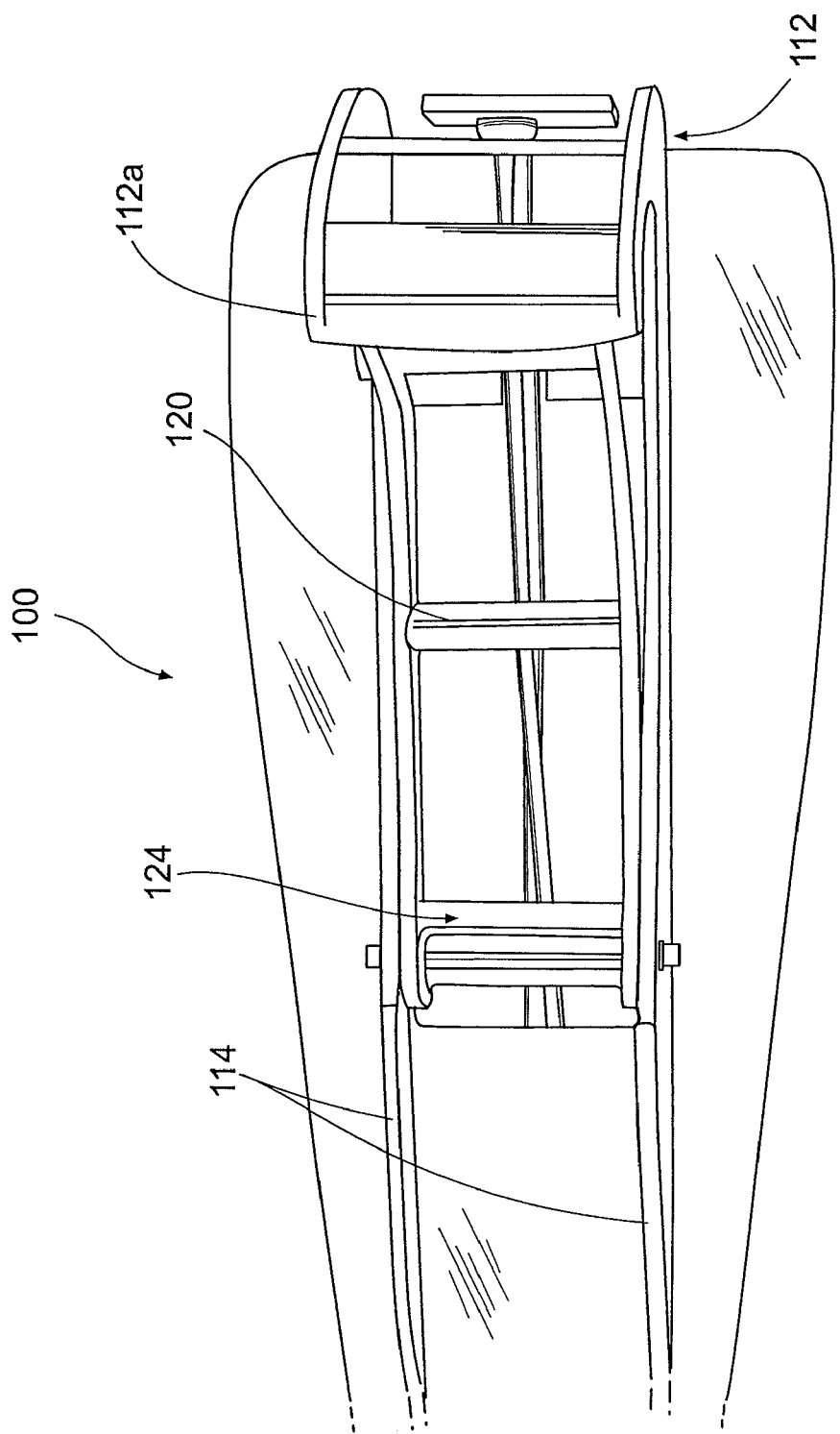
FIGS. 14-19 illustrate various views of a device holder for a portable data acquisition device according to one embodiment of the present invention.
Figure 15:
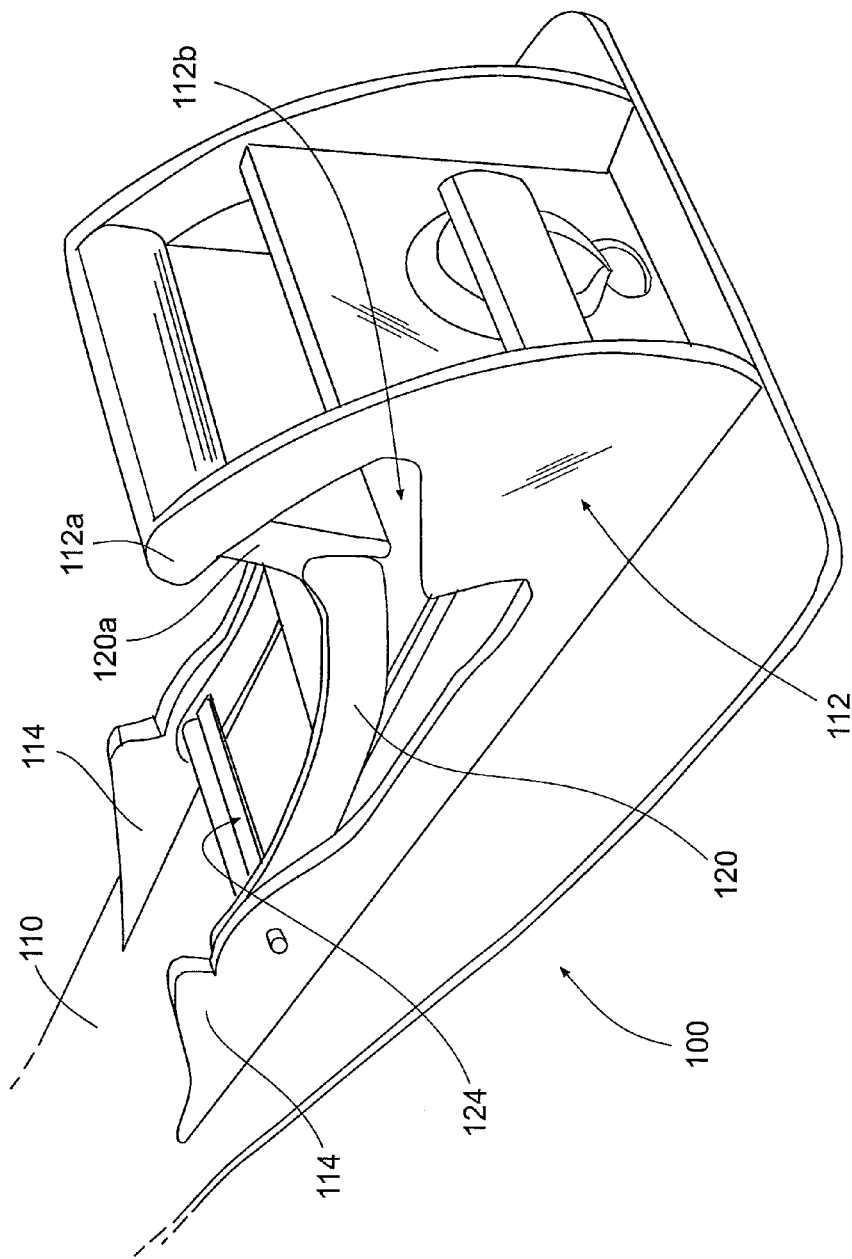
Figure 16:
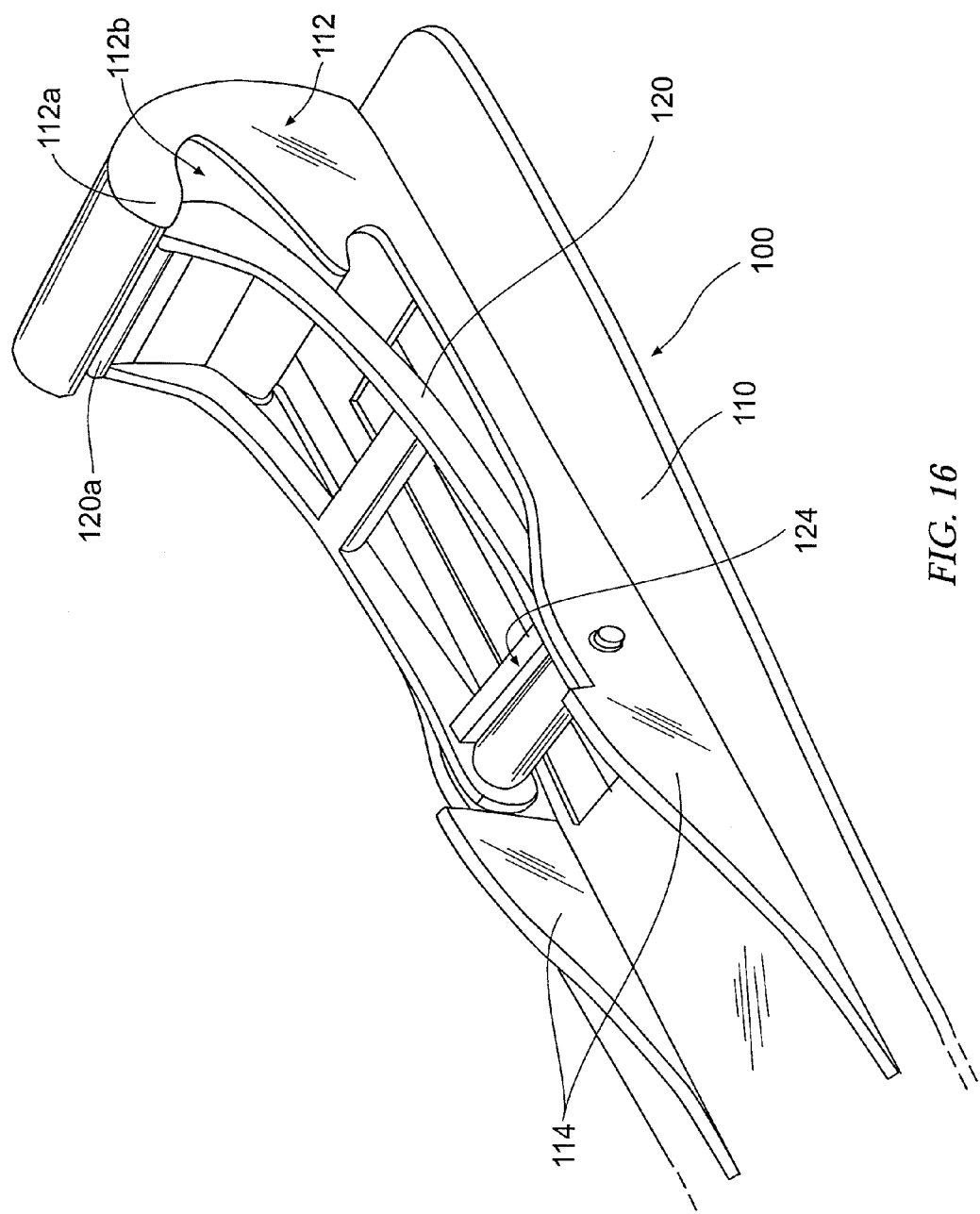
Figure 17:
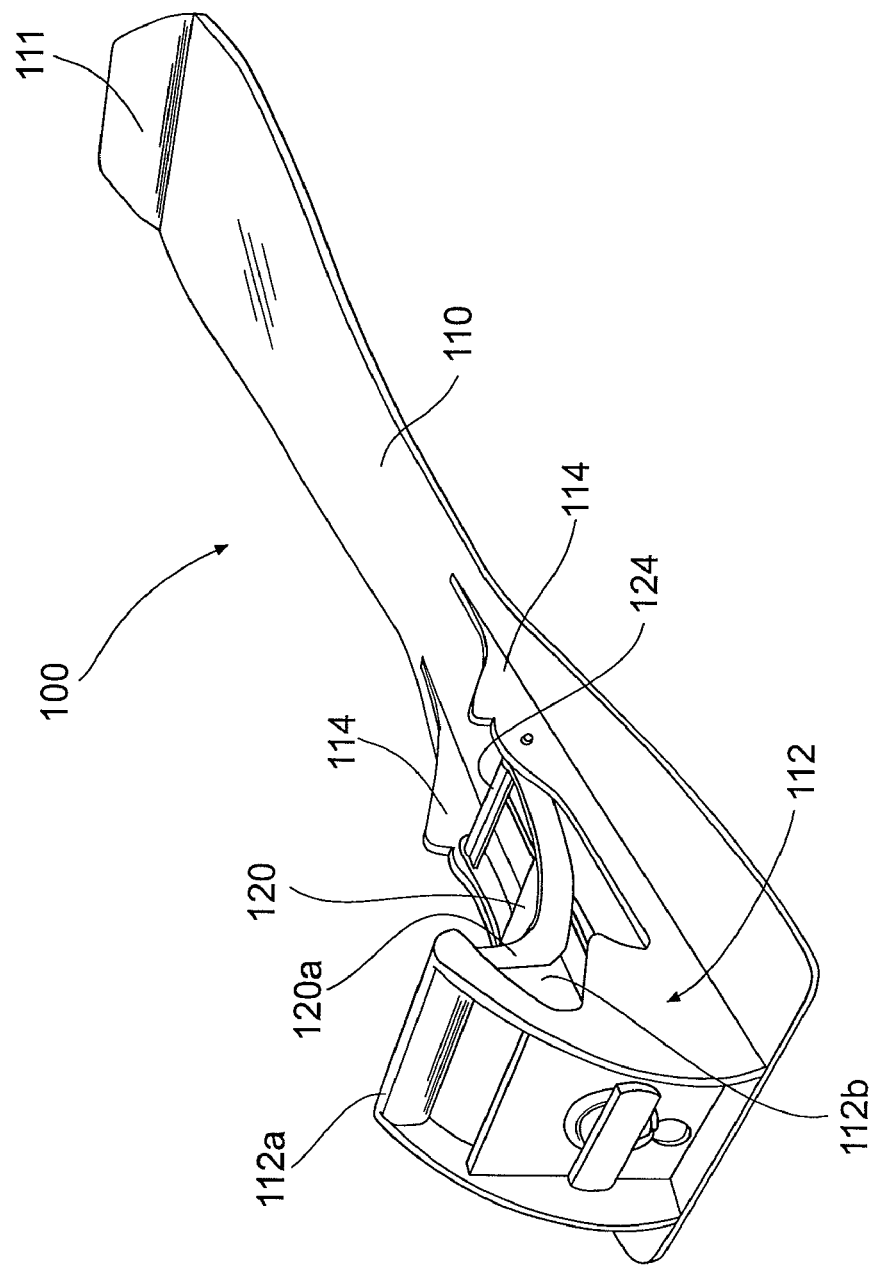
Figure 18:
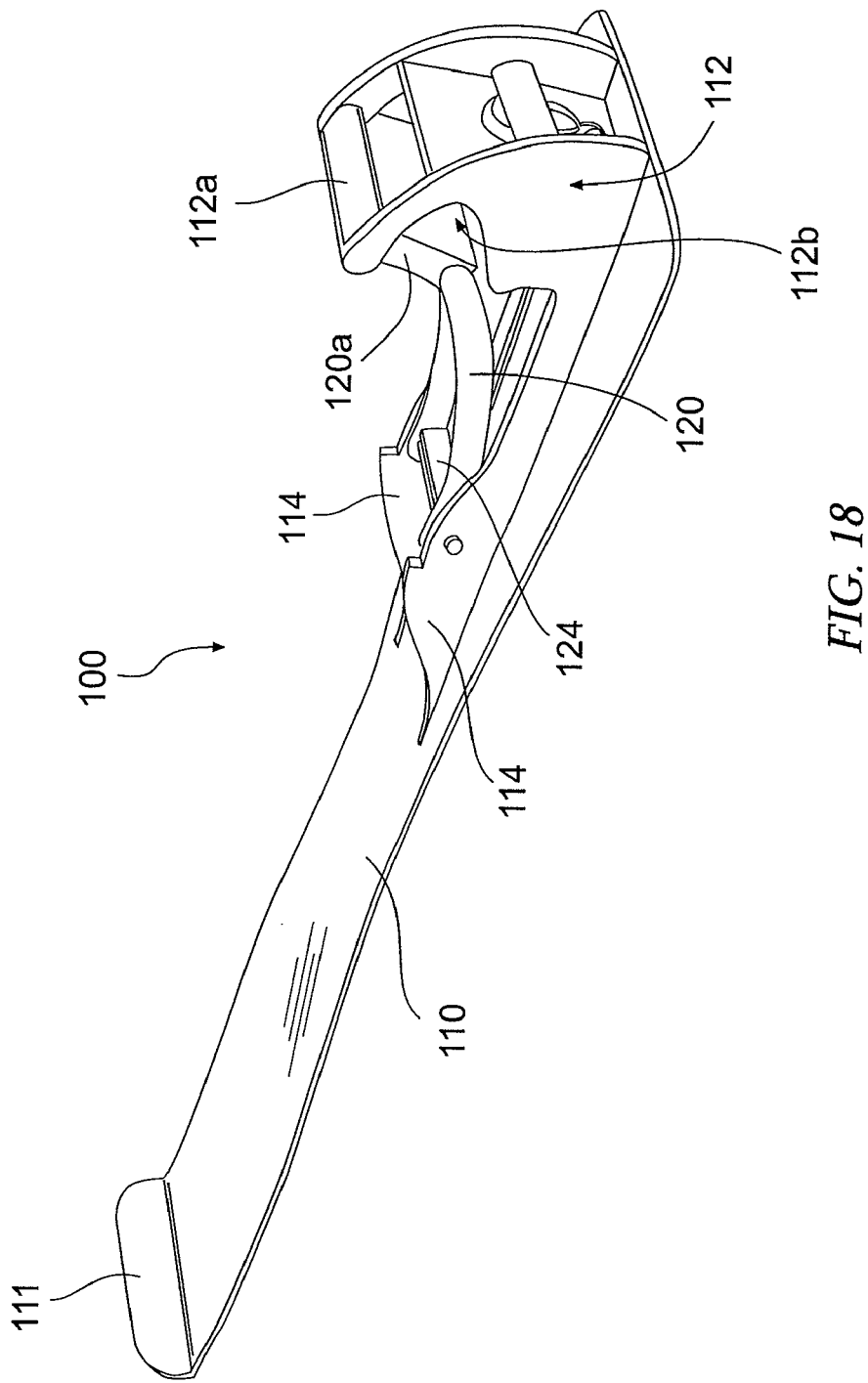
Figure 19:
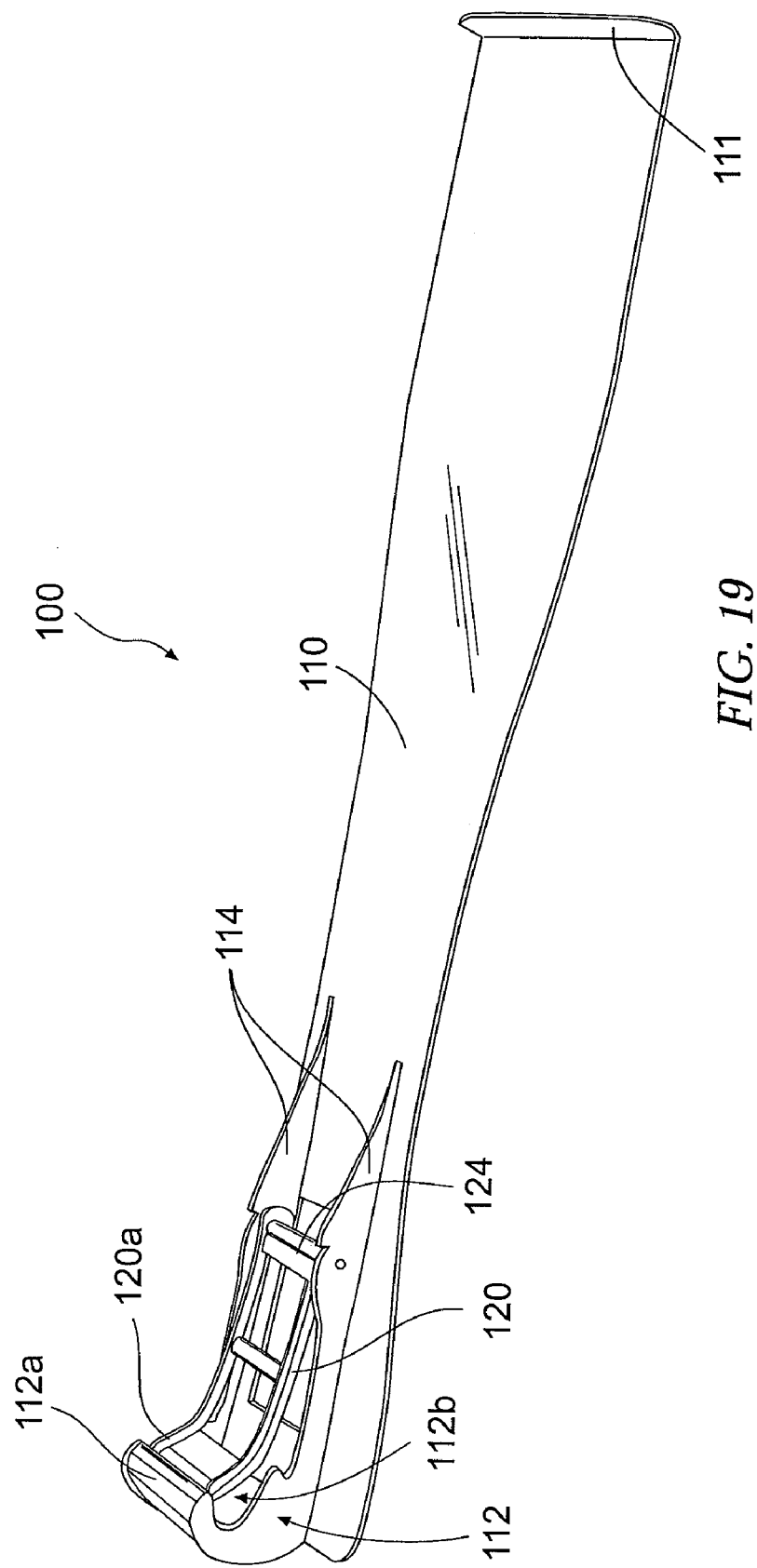

Even though the device 1 as described herein has many functional advantages, it may still be inconvenient for the user to carry the device 1 in hand on a regular basis. Accordingly, particularly advantageous embodiments of the present invention comprise a holder 100 or holder assembly, as shown in FIGS. 14-19, configured to be removably engaged with the device 1, as shown in FIGS. 10-12. Though the device 1 is described herein as including a pin 50 extending along an end of the device 1 and a pair of shoulders 60 integral with the device 1 and positioned adjacent to the pin 50 so as to provide support therefor, it will be understood and readily appreciated by one skilled in the art that these components may be integral with the device 1 or provided separately from the device 1 and secured thereto in many different manners such as, for example, with fasteners or adhesive. In one embodiment, the pin 50 generally provides the main point of attachment to the holder 100.

In one embodiment, the holder 100 comprises a generally elongate arm 110 having a first end 111 adapted to be attached to the user. For example, the first end 111 may be configured to be attached about a belt, to a belt loop, or to a pocket of the user's uniform. The arm 110 extends to a second end having an integral or fixedly-attached hook 112 extending therefrom, wherein the hook includes a tine 112*a* and defines a span 112*b* between the tine 112*a* and the arm 110. The second end of the arm 110 also includes a pair of rails 114 extending along the arm 110. A gate 120 is rotatably attached to the rails 114 at a hinged end 124 of the gate 120, wherein the gate 120 has a free end 120*a* that extends across the span 112*b* to the tine 112*a* of the hook 112. The gate 120 is biased by a biasing device (not shown), such as a spring or elastic band, engaged between the gate 120 and the rails 114 and/or the arm 110, such that the free end 120*a* of the gate 120 is normally urged against the tine 112*a*. In this manner, the span 112*b* is enclosed by the tine 112*a*, the arm 110, and the gate 120 and, in one embodiment, is configured to receive, retain, and secure the pin 50 therein.

The shoulders 60 are spaced apart to define a channel 70 therebetween, wherein the shoulders 60 are secured to or extend from one end of the device 1. The pin 50 is secured between the shoulders 60 so as to span the channel 70. According to one embodiment of the present invention, when engaging the pin 50 with the hook 112, the channel 70 is brought into engagement with the rails 114. The device 1 is then directed toward the hook 112, with the device 1 directed downwardly, such that the casing 10, the pin 50, and/or the shoulders 60 engage the gate 120. The gate 120 is then urged toward the arm 110 against the biasing of the biasing device such that the free end 120*a* is separated from the tine 112*a*. Once the free end 120*a* is separated from the tine 112*a*, the pin 50 is capable of entering the span 112*b* of the hook 112. Further, as the pin 50 enters the span 112*b*, the casing 10 and/or the shoulders 60 are configured to disengage the gate 120 so as to allow the biasing device to urge the free end 120*a* back against the tine 112*a* and secure the pin 50 within the span 112*b*. Preferably the process of engaging the device 1 with the holder 100 can be performed by the user by using just one hand. Once the pin 50 is secured within the span 112*b*, the device 1 may be rotated about the pin 50 to certain extent. For example, where the shoulders 60 and pin 50 are engaged with an end of the device 1 about the lower end of the keypad 20, the device 1 may be configured to be engaged with the holder 100 such that the keypad 20 and display 30 are facing away from the user when the holder 100 is attached to, for example, the user's belt. Accordingly, the device 1 may be rotated about the pin 50 so as to extend, for instance, at an angle of about 90 degrees (though this angle may vary considerably depending on the requirements of a particular situation) with respect to the user and, in this manner, the device 1 may be operated by the user without being disengaged from the holder 100.

In order to disengage the device 1 from the holder 100, as shown in FIGS. 13A-13D, the device 1 is rotated about the pin 50, over the tine 112*a* and toward the first end 111 of the holder 100. After the device 1 is rotated to a certain extent such as, for example, to an angle of about 90 degrees with respect to the user, the shoulders 60 are brought into engagement with the gate 120 and begin to urge the gate 120 back toward the arm 110 against the biasing of the biasing device, the gate 120 rotating about the engagement with the rails 114. The gate 120 is further configured such that, though the free end 120*a* may be separated from the tine 112*a*, the pin 50 cannot be removed from the span 112*b* until a certain separation is reached. As such, as the device 1 is further rotated about the pin 50, the shoulders 60 continue to urge the gate 120 toward the arm 110 until a sufficient separation point is attained between the free end 120*a* and the tine 112*a* is attained and the device 1 can be lifted such that the pin 50 exits the span 112*b* while the shoulders 60 maintain the gate 120 toward the arm 110. Preferably, the rotation of the device 1 and separation of the device 1 from the holder 100 is also accomplished using just one hand of the user. At the separation point where the device 1 can be removed from the span 112*b*, the device 1 is preferably in a position to be securely and naturally grasped by the user. In one instance, the device 1 may approach a vertical orientation before being removable from the holder 100.

According to another advantageous aspect of the present invention, the engagement and disengagement of the device 1 with respect to the holder 100 can be accomplished without requiring any significant visual attention by the user. That is, the device 1 and/or the holder 100 may be configured to provide an auditory alert and/or a tactile cue to the user about the status of the device 1 with respect to the holder 100. For example, when the user intends to place the device 1 into the holder 100, the channel 70 may be slid along the arm 110 until the rails 114 begin to engage the channel 70. The channel 70 and the rails 114 may be configured to provide some indication of a positive engagement therebetween and that the device 1 is properly aligned with the holder 100 for the pin 50 to be inserted into the span 112*b* of the hook 112. For example, the rails 114 may be sufficiently spaced to form a sliding fit with the channel 70 when engaged therewith. In other instances, the channel 70 may be provided with opposing slots (not shown) and the rails 114 provided with protruding tabs (not shown) configured to engage the slots when the channel 70 is engaged with the rails 114. In this manner, proper alignment of the device 1 with the holder 110 is indicated by a tactile cue instead of requiring the constant visual attention of the user.

Further, as the device 1 is directed along the rails 114, the shoulders 60 and/or the casing 10 begin to urge the gate 120 to rotate back against the arm 110 against the biasing device so as to allow the pin 50 to enter the span 112*b* of the hook 112. Once the pin 50 enters the span 112*b*, the shoulders 60 and/or the casing 10 are configured to disengage the gate 120 such that the free end 120*a* is caused by the biasing device to rotate outwardly to impact the tine 112*a*. The impact may cause, for example, a click, that would provide the user with positive auditory feedback and/or tactile cue that the device 1 is fully and securely engaged with the holder 100. In other instances, the holder 100 and/or the device 1 may be provided with a sensor (not shown) configured to sense when the pin 50 has entered the span 112*b* and is secured therein by the free end 120*a* engaging the tine 112*a*. Upon sensing the fully engaged condition, the sensor may be further configured to direct an alert device (not shown), also engaged with the holder 100 and/or the device 1, to provide an auditory alert and/or a tactile cue to the user such as, for example, a beep alarm and a vibration of the holder 100 and/or the device 1. In such instances, the user is provided with positive assurance that the device 1 is firmly secured to the holder 100.

In other instances, the gate 120 biased by the biasing device may also provide a positive tactile cue to the user about the engagement status between the device 1 and the holder 100. That is, as the device 1 is being inserted into the holder 100, the gate 120 must be displaced against the biasing of the biasing device. Accordingly, the force of the biasing device is translated through the gate 120 and through the device 1 to the hand of the user, wherein the resistance encountered by the user inserting the device 1 into the holder 100 would provide a tactile cue that the device 1 is not yet firmly secured to the holder 100. Further, as previously discussed, the device 1, still secured to the holder 100, can be rotated about the pin 50 and over the tine 112*a* to a certain extent without causing the device 1 to disengage from the holder 100. However, if the device 1 is rotated too far, the shoulders 60 and/or the casing 10 begin to urge the gate 120 to rotate back toward the arm 110, thereby beginning the disengagement process. Again, the force of the biasing device against the gate 120 is translated through the gate 120 and through the device 1 to the hand of the user, thereby providing a tactile cue to the user that further rotation of the device 1 will lead to disengagement of the device 1 from the holder 100. Accordingly, the prevention of both incomplete engagement and accidental disengagement of the device 1 with respect to the holder 100 is addressed.

The application program interfaces (API's) or other software of the present invention, each of which comprises an ordered listing of selectable services, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Further, any process descriptions or blocks in flow charts should be understood as representing modules, segments, or portions of code which include one or more executable instructions for implementing specific logical functions or steps in the process, and alternate implementations are included within the scope of the preferred embodiments of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention and to the associated drawings without departing substantially from the spirit of the principles of the invention. For example, although many of the embodiments disclosed herein are described in terms of their usefulness in the field of portable electronic devices, it is recognized that many of these embodiments may have applicability and uses in other fields. Further, one skilled in the art will also appreciate that the device 1 as described herein may include many different combinations of any or all of the various disclosed aspects of the present invention. In addition, it will be understood that any of the devices or systems described herein may also have a corresponding method, while any of the described methods may also have a corresponding device or system. All such modifications and variations are intended to be included herein within the scope of the disclosure and present invention and protected by the following claims. In concluding the detailed description, it should be noted that it will be readily apparent to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions. In addition, although specific terms are employed herein, they are used in a generic and descriptive sense only and not for purposes of limitation.

That which is claimed:

1. A method of delivering an item to a desired location, said method comprising:
   loading location information associated with the desired location into a data acquisition device having an immediate location, wherein the location information comprises GPS data associated with the desired location;
   receiving an indication that the item is about to be delivered;
   determining GPS data associated with the immediate location, upon receipt of the indication;
   comparing the GPS data associated with the immediate location with the GPS data associated with the desired location; and
   delivering the item when the GPS data associated with the immediate location substantially corresponds to the GPS data associated with the desired location.

2. The method of claim 1, wherein the location information comprises a latitude and a longitude associated with the desired location.

3. The method of claim 1 further comprising:
   generating an alert where the GPS data associated with the immediate location does not substantially correspond with the GPS data associated with the desired location.

4. The method of claim 3, wherein the location information further comprises a destination address associated with the desired location, said method further comprising:
   determining, in response to the alert, whether the destination address corresponds with the immediate location; and
   modifying the GPS data associated with the desired location, upon a determination that the destination address corresponds with the immediate location.

5. The method of claim 4 further comprising:
   transmitting the modified GPS data associated with the desired location to a host system for universally updating data associated with the desired location.

6. The method of claim 1, wherein the location information further comprises a destination address associated with the desired location, said method further comprising:
   if the GPS data associated with the immediate location substantially corresponds with the GPS data associated with the desired location, determining an actual address associated with the immediate location;
   comparing the actual address with the destination address; and
   if the actual address does not correspond with the destination address, storing the destination address as an alias of the actual address, and the actual address as an alias of the destination address.

7. The method of claim 6 further comprising:
   linking supplemental data to the destination address, wherein the supplemental data is selected from the group consisting of census data, zip code+4 data, revenue data, injury data, accident data, theft data, damage data, maintenance data, special request data, preference data, and combinations thereof.

8. The method of claim 1 further comprising:
   determining, upon loading of the location information into the portable data acquisition device, GPS data associated with the immediate location; and
   determining a route between the immediate location and the desired location.

9. The method of claim 1 further comprising:
   tracing a route between the immediate location, at the time the location information was loaded into the portable data acquisition device, and the desired location as the item is delivered to the desired location.

10. The method of claim 1, wherein the portable data acquisition device comprises at least one of a Wireless Local Area Network (WLAN) data radio or a Wireless Wide Area Network (WWAN) data radio configured to receive the location information from a carrier server, said method further comprising:
    determining, upon delivery of the item, actual GPS data associated with the immediate location, said actual GPS data comprising a time of delivery and a physical location of delivery; and
    directing at least one of the time of delivery or the physical location of the delivery to the carrier server via at least one of the WLAN data radio or the WWAN data radio.

11. The method of claim 1, wherein loading location information comprises capturing the location information from an identifier associated with the item.

12. A data acquisition device, comprising:
    a GPS sensor configured to determine a GPS position of a location, comprising a latitude and a longitude of the location; and
    a processor configured to receive location data for a destination address, the location data having a latitude and a longitude associated with the destination address, the processor being further configured to compare the GPS position of the location to the location data associated with the destination address, and to provide an alert if the comparison exceeds a selected threshold.

13. The device of claim 12 wherein the processor is further configured to verify that the location corresponds to the destination address and, if the GPS position of the location does not substantially correspond to the location data associated with the destination address, modify the location data associated with the destination address to the GPS position of the location.

14. The device of claim 12 wherein the processor is further configured to receive an actual address of the location if the actual GPS position of the location corresponds to the location data associated with the destination address.

15. The device of claim 14 wherein the processor is further configured to direct that the actual address be saved as an alias of the destination address if the actual address does not correspond to the destination address.

16. The device of claim 14 wherein the processor is further configured to direct that the destination address be saved as an alias of the actual address if the destination address does not correspond to the actual address.

17. The device of claim 12 wherein the location data for the destination address further comprises a route between an original address and the destination address, and wherein the processor is further configured to determine a GPS position of an instant location along the route and to determine the time of the GPS position determination for the instant location.

18. A system for collecting delivery data, the delivery data including at least one of time study statistics or work measurement statistics, associated with a driver of a delivery vehicle for a carrier, said system comprising:
   a data acquisition device including a GPS sensor configured to determine GPS data;
   at least one sensor operably engaged with the delivery vehicle and configured to sense the data acquisition device being within a proximity to at least one of the delivery vehicle or a selected location, said sensor further configured to determine particular data based at least in part on when the data acquisition device is within proximity to at least one of the delivery vehicle or the selected location; and
   an application residing on the data acquisition device, the application being configured to selectively direct, in real time, reception and recordation of the GPS data from the GPS sensor and reception and recordation of the particular data from the at least one sensor.

19. The system of claim 18 wherein the at least one sensor is further configured to determine a time at which the data acquisition device is within proximity to at least one of the delivery vehicle, a selected location, or the at least one sensor.

20. The system of claim 18, wherein the application is further configured to direct at least one of the GPS data or the particular data to the carrier, said system further comprising:
   a controller operably engaged with the delivery vehicle, the controller being configured to at least one of receive an instruction from the carrier and perform an operation in response thereto or receive a query from the carrier and determine and provide a reply thereto.

21. A system for delivering an item to a desired location, said system comprising:
   a portable data acquisition device configured to receive location information associated with a desired location;
   a host system configured to provide the location information associated with the desired location to the portable data acquisition device;
   a GPS sensor operably engaged with the portable data acquisition device, said GPS sensor configured to determine GPS data associated with an immediate location; and
   a processor operably engaged with the portable data acquisition device said processor configured to compare the location information associated with the desired location to the GPS data associated with the immediate location, and to generate a notification in response to the comparison;
   wherein the portable data acquisition device is further configured to receive an indication that the item is about to be delivered, and wherein, upon receipt of the indication, if the GPS data associated with the immediate location does not substantially correspond with the location information associated with the desired location, the processor is further configured to generate an alert.

22. The system of claim 21 further comprising:
   a central database accessible by the portable data acquisition device, said central database comprising location information associated with a plurality of desired delivery locations, said location information comprising GPS data and a destination address associated with respective desired delivery locations.

23. The system of claim 22, wherein, in response to the alert, if it is determined that the immediate location substantially corresponds with the desired location, the portable data acquisition device is configured to replace at least part of the location information associated with the desired location in the central database with the GPS data associated with the immediate location.

24. The system of claim 22, wherein the location information received by the portable data acquisition device comprises a destination address and GPS data associated with the desired location, said system further comprising:
   an alias database comprising one or more aliases corresponding with respective destination addresses of the central database, wherein if the GPS data associated with the immediate location substantially corresponds with the GPS data associated with the desired location, the processor is further configured to determine an actual address associated with the immediate location, to compare the actual address with the destination address associated with the desired location, and, if the actual address does not correspond with the destination address, to store the actual address as an alias of the destination address in the alias database.

* * * * *